(12) United States Patent
Allam et al.

(10) Patent No.: US 11,732,206 B2
(45) Date of Patent: *Aug. 22, 2023

(54) SEPARATION OF SULFUROUS MATERIALS

(71) Applicant: 8 Rivers Capital, LLC, Durham, NC (US)

(72) Inventors: Rodney John Allam, Chippenham (GB); Navid Rafati, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,607

(22) Filed: Aug. 17, 2022

(65) Prior Publication Data

US 2022/0389342 A1 Dec. 8, 2022

Related U.S. Application Data

(63) Continuation of application No. 16/404,376, filed on May 6, 2019, now Pat. No. 11,447,710.

(Continued)

(51) Int. Cl.
*C10L 3/10* (2006.01)
*B01D 3/32* (2006.01)
(Continued)

(52) U.S. Cl.
CPC .............. *C10L 3/103* (2013.01); *B01D 3/322* (2013.01); *B01D 3/34* (2013.01); *B01D 53/1493* (2013.01);
(Continued)

(58) Field of Classification Search
CPC .. C10L 3/10; C10L 3/103; B01D 3/32; B01D 3/34; B01D 53/14; B01D 3/322; B01D 53/1493
See application file for complete search history.

(56) References Cited

U.S. PATENT DOCUMENTS

| | | | | |
|---|---|---|---|---|
| 3,339,342 A | * | 9/1967 | Blaker | B01D 53/526 95/236 |
| 4,318,723 A | | 3/1982 | Holmes et al. | |
| 4,957,515 A | * | 9/1990 | Hegarty | B01D 53/1425 95/162 |
| 5,753,010 A | * | 5/1998 | Sircar | B01D 53/047 95/143 |

(Continued)

FOREIGN PATENT DOCUMENTS

| | | |
|---|---|---|
| CN | 106 335 876 | 1/2017 |
| CN | 107 381 503 | 11/2017 |

(Continued)

OTHER PUBLICATIONS

Demirbas (Methane Gas Hydrate, Chapter 2 Natural Gas) 2010.

*Primary Examiner* — Youngsul Jeong
(74) *Attorney, Agent, or Firm* — Womble Bond Dickinson (US) LLP

(57) ABSTRACT

The present disclosure relates to systems and methods for separation of sulfurous material(s) from a multi-component feed stream. The systems and methods can comprise contacting the multi-component feed stream with a solvent in a contacting column so that at least a portion of the sulfurous material(s) is transferred from the multi-component feed stream to the solvent. A stream of a substantially purified gas can thus be provided along with a liquid stream comprising at least a majority of the sulfurous material. In particular, the solvent can comprise liquid carbon dioxide, which can be particularly beneficial for removing sulfurous materials from multi-component feed streams.

8 Claims, 8 Drawing Sheets

Related U.S. Application Data

(60) Provisional application No. 62/668,001, filed on May 7, 2018, provisional application No. 62/685,724, filed on Jun. 15, 2018, provisional application No. 62/696,938, filed on Jul. 12, 2018.

(51) Int. Cl.
 *B01D 3/34* (2006.01)
 *B01D 53/14* (2006.01)

(52) U.S. Cl.
 CPC .......... *C10L 3/104* (2013.01); *B01D 2252/10* (2013.01); *B01D 2257/304* (2013.01); *B01D 2257/306* (2013.01); *B01D 2257/504* (2013.01); *C10L 2290/541* (2013.01); *C10L 2290/543* (2013.01)

(56) References Cited

U.S. PATENT DOCUMENTS

| | | | |
|---|---|---|---|
| 6,112,547 A * | 9/2000 | Spauschus | C09K 5/041 |
| | | | 62/476 |
| 8,312,738 B2 | 11/2012 | Singh et al. | |
| 8,955,354 B2 | 2/2015 | Huang et al. | |
| 9,945,605 B2 | 4/2018 | Pellegrini | |
| 2005/0287056 A1 | 12/2005 | Baker et al. | |
| 2010/0147022 A1 * | 6/2010 | Hart | F25J 3/0242 |
| | | | 62/601 |

FOREIGN PATENT DOCUMENTS

| | | | |
|---|---|---|---|
| EP | 2 722 095 | 4/2014 | |
| WO | WO 2004/058384 | 7/2004 | |
| WO | WO 2004/089499 | 10/2004 | |
| WO | WO-2004089499 A2 * | 10/2004 | .......... B01D 53/002 |

\* cited by examiner

SEPARATION OF SULFUROUS MATERIALS

CROSS-REFERENCE TO RELATED APPLICATIONS

The present application is a continuation of U.S. patent application Ser. No. 16/404,376, filed May 6, 2019, which claims priority to U.S. Provisional Patent Application No. 62/668,001, filed May 7, 2018, U.S. Provisional Patent Application No. 62/685,724, filed Jun. 15, 2018, and U.S. Provisional Patent Application No. 62/696,938, filed Jul. 12, 2018, the disclosures of which are incorporated herein by reference.

FIELD OF THE INVENTION

The present disclosure relates to separation of sulfurous materials from mixed streams, particularly gaseous streams. Separation can be carried out utilizing systems and methods whereby the mixed stream is contacted with a removal solvent, and particularly wherein the removal solvent comprises carbon dioxide.

BACKGROUND

Natural gas streams are often contaminated with one or more further components, such as sulfur compounds (e.g., hydrogen sulfide- or $H_2S$) and carbon dioxide ($CO_2$). In addition to containing methane ($CH_4$— or "$C_1$"), natural gas and associated natural gas streams often contain significant quantities of longer chain hydrocarbons, such as ethane ($C_2H_6$— or "$C_2$") and even higher carbon number hydrocarbons, include $C_3$ and greater hydrocarbons. These higher number hydrocarbons can be separated to provide valuable hydrocarbon streams, particularly upon removal of contaminants, such as hydrogen sulfide and carbon dioxide. As an example, natural gas stream sourced in Abu Dhabi can have an approximate composition as follows (on a molar, water-free basis): 65% $CH_4$; 6.5% $C_2H_6$; 3% $C_3H_8$; 0.46% $nC_4H_{10}$; 0.54% $C_4H_{10}$; 0.4% $C_5H_{12}$; 0.1% $C_6H_{14}$; 16% $H_2S$; and 8% $CO_2$.

Current methods of removing $H_2S$ and $CO_2$ from mixed gas streams, such as natural gas streams, include: amine scrubbing; membrane treatment; adsorption on solid adsorbents; processing in low temperature separation systems such as the Ryan-Holmes process (see U.S. Pat. No. 4,318,723), the Controlled-Freeze zone® process (see U.S. Pat. No. 8,312,738), and the processes described in U.S. Pat. No. 9,945,605; and hybrid processes that use a combination of any aforementioned methods, such as the hybrid processes described in U.S. Pat. No. 8,955,354. These processes all involve high capital investments and high ongoing operating costs and inevitably lead to significant discharge of $CO_2$ to the atmosphere from the energy systems associated with them. If substantial amount of $H_2S$ is available in the sour gas, cryogenic processes such as Ryan-Holmes or Controlled-Freeze zone may not be economic, and conventional amine processes may be preferred due to overall lower costs. The use of cryogenic natural gas sweetening process in the presence of high $H_2S$ content would require an additional treatment step for removal of $H_2S$ from methane or ethane streams. This is due to inability of these processes in confining the $H_2S$ content of the feed stream as a single product stream. For example, in the Ryan Holmes process the $H_2S$ impurity in the sour gas feedstock is generally mixed with ethane product and a further $H_2S$ separation from ethane will be required. This condition may favor the use of a conventional amine plant for lower overall cost. Amine processes for high $H_2S$ and/or $CO_2$ gas tend to be energy intensive and have high investment and operating costs.

There remains a need in the art for lower cost, simpler processes that have reduced emission or substantially zero emission of $CO_2$ into the atmosphere. The present disclosure thus relates to systems and methods whereby $CO_2$ removed from natural gas (or another mixed gas stream) together along with $CO_2$ derived from an associated energy system providing power to the process preferably can be made available at high pressure with negligible hydrocarbon content for reinjection into geologic formations or for other uses. The $CO_2$ stream further preferably can be made available for enhanced oil recovery. The $C_3$ plus hydrocarbons separated from the mixed gas stream preferably can be separated with $H_2S$ content (or other sulfurous material content) below about 2 ppm. The $H_2S$ (or other sulfurous material) preferably can be separated as a concentrated stream for use as a feed stream to a Claus sulfur production plant, as feed to a sulfuric acid plant, and/or other potential uses. The $H_2S$ containing stream or other sulfurous material preferably can be produced at high pressure for sequestration in a geologic formation such as a depleted gas or oil well. The natural gas stream (or other gas stream purified of at least a sulfurous material) preferably can have a sulfur content (such as an $H_2S$ content) below about 2 ppm and a $CO_2$ content below about 2% by volume.

SUMMARY OF THE INVENTION

The present disclosure relates to systems and methods useful in the separation of a sulfurous material from a mixed gaseous stream. The systems and methods particularly can be adapted to or configured to contact the mixed gaseous steam comprising the sulfurous material with a solvent comprising one or more components suitable for removal of at least a portion of the sulfurous material from the mixed gaseous stream. For example, in some embodiments, liquid carbon dioxide can be particularly useful for selectively separating a wide variety of sulfur species from a mixed gaseous stream. The result is a substantially purified gas product and liquid stream that can be further processed as desired. In some embodiments, a method for separating a sulfurous material from a multi-component feed stream particularly can comprise: injecting a multi-component feed stream including at least a sulfurous material and a fuel gas into a contacting column; injecting a solvent stream comprising liquid carbon dioxide into the contacting column so that the solvent stream comprising the liquid carbon dioxide contacts the multi-component feed stream; withdrawing from the contacting column a bottom product stream containing at least a portion of the sulfurous material from the multi-component feed stream; and withdrawing from the contacting column an overhead vapor stream containing at least a portion of the fuel gas.

In one or more embodiments, the present disclosure relates to systems and methods for separating and/or purifying various multi-component feed streams, particularly separating sulfurous materials therefrom, utilizing carbon dioxide. The present disclosure provides a uniquely simple and economic process to separate, for example, acidic impurities such as sulfur compounds from fuel gas streams and/or other multi-component feed streams. For example, fuel gas streams suitable for use according to the present disclosure may be generated from various processes such as oxy-fuel combustion and power generation, natural gas processing, and hydrogen generation. The presently disclosed systems and methods are particularly useful when a relatively large amount of hydrogen sulfide is present within the gaseous stream, and a source of carbon dioxide is readily available. The present process can operate at temperatures near the triple point of pure carbon dioxide (i.e., −56.4° C. at 5.2 bar), which eliminates the solidification of contaminants and the need to process solid particles. The process has a simple layout and requires a relatively small amount of electricity to generate required refrigeration.

The present systems and methods are configured to generate a purified and substantially clean carbonaceous material (e.g., a fuel gas) stream from a multi-component feed stream including a sulfurous material using refrigeration and fractionation. The multi-component feed stream with the sulfurous material can be cooled down to a temperature near the $CO_2$ triple point and then treated in a suitable contacting column (e.g., a mass transfer column or a distillation column) using liquid carbon dioxide to generate a substantially sulfur free stream from the starting material at overhead vapor and a sulfur enriched bottom product. The process can be integrated with any chemical process that requires cleanup of a process stream contaminated with sulfur species such as hydrogen sulfide. Carbon dioxide used in the scrubbing fluid can originate from a carbon dioxide containing stream within the integrated process or from an external source, and the carbon dioxide can be substantially pure or may contain one or more contaminants. The presently disclosed systems and methods thus can be effective for separating a carbonaceous stream (e.g., a fuel gas stream) from contaminating compounds (e.g., hydrogen sulfide, carbonyl sulfide, mercaptans, and other sulfur compounds with a condensation temperature close to that of hydrogen sulfide, and water vapor). For example, the process can include the use of a separation column system for processing a contaminated stream at a temperature close to the freezing point of carbon dioxide using liquid carbon dioxide solvent to produce contaminant-free overhead vapor and bottoms liquid product enriched in sulfur-containing contaminants.

In further embodiments, the separation column can have a reboiler for boiling a portion of the sulfur-contaminants enriched bottoms liquid by indirect heat exchange against a cooling contaminated process stream to produce cooled contaminated process stream fluid. Moreover, a heat exchanger can be used for cooling pure $CO_2$ using separation column bottoms and overhead products by indirect heat exchange to produce condensed, pure carbon dioxide fluid. Still further, a first pressure reduction arrangement can be used for reducing the pressure of the contaminated process stream to produce a reduced pressure, contaminated process stream. Similarly, a second pressure reduction arrangement can be used for expanding the contaminated process stream to reduce its temperature to within about 5° C. of the freezing point of the $CO_2$ (i.e., to a temperature of about −56.4° C.). In certain embodiments, the present disclosure particularly may provide a method of purification of a process stream containing a sulfurous material, the method comprising passing the process stream containing the sulfurous through a contacting column (e.g., a mass transfer column) along with a stream of a solvent comprising liquid carbon dioxide such that the process stream exiting the contacting column comprises a reduced level of the sulfurous material.

In some embodiments, the present disclosure can particularly provide methods for separating a sulfurous material from a multi-component feed stream. For example, the method can comprise: injecting a multi-component feed stream including at least a sulfurous material and a fuel gas into a contacting column; injecting a solvent stream comprising liquid carbon dioxide into the contacting column so that the solvent stream comprising the liquid carbon dioxide contacts the multi-component feed stream; withdrawing from the contacting column a bottom product stream containing at least a portion of the sulfurous material from the multi-component feed stream; and withdrawing from the contacting column an overhead vapor stream containing at least a portion of the fuel gas. In further embodiments, the method can be additionally described in relation to one or more of the following statements, which can be combined in any number and order.

The method can comprise injecting the multi-component feed stream and the solvent stream into the contacting column in a spatially separated arrangement so that the solvent stream flows in a downwardly direction for contacting the multi-component feed stream and the multi-component feed stream flows in an upwardly direction for contacting the solvent.

The contacting column can be a distillation column.

The contacting column can be a counter-current contacting column.

Prior to injecting of the multi-component feed stream into the contacting column, the multi-component feed stream can comprise carbon dioxide in an amount of at least 2% on a molar basis.

The sulfurous material in the multi-component feed stream can be selected from the group consisting of hydrogen sulfide, carbonyl sulfide, thiol-containing compounds, and combinations thereof.

The multi-component feed stream injected into the contacting column can be at a temperature of about −10° C. to about −55° C.

The solvent stream injected into the contacting column can be at a temperature of about −10° C. to about −55° C.

The contacting column can be operated under conditions such that substantially no portion of any carbon dioxide in the contacting column is solidified during passage through the contacting column.

The solvent stream injected into the contacting column can be at a temperature and pressure such that substantially all of the carbon dioxide contained therein is in a liquid state.

The solvent stream injected into the contacting column can be at a pressure of about 7 bar to about 100 bar.

Prior to the injecting steps, the method further can comprise passing one or both of the multi-component feed stream and the solvent stream through a heat exchanger against at least a portion of the overhead vapor stream that is withdrawn from the contacting column so that the overhead vapor stream is heated and one or both of the multi-component feed stream and the solvent stream is cooled.

The method further can comprise evaporating one or more streams of a liquid refrigerant in the heat exchanger to maintain a heat balance thereof.

The one or more streams of liquid refrigerant can comprise liquid carbon dioxide.

The overhead vapor stream withdrawn from the contacting column can comprise less than 2% molar of the sulfurous material.

The overhead vapor stream withdrawn from the contacting column can comprise less than 2 ppm molar of the sulfurous material.

The contacting column can be operated at a pressure of about 7 bar to about 100 bar.

The contacting column can be configured for heat removal at one or more stages present in the contacting column at a position that is higher in the contacting column than a position for the injecting of the multi-component feed stream.

The contacting column can comprise a re-boiler.

At least a portion of the multi-component feed stream can be passed through the re-boiler prior to said injecting into the contacting column.

The method further can comprise passing the overhead vapor stream through a separation unit configured for removal of at least a portion of any carbon dioxide present in the overhead vapor stream.

The separation unit can be a membrane separator configured for separating the overhead vapor stream into a product fuel gas stream and a permeate stream comprising at least carbon dioxide.

The product fuel gas stream can contain less than 2 ppm molar of the sulfurous material.

The product fuel gas stream can contain less than 2% molar of the solvent.

The method further can comprise recycling at least a portion of the carbon dioxide from the permeate stream to the solvent stream prior to said injecting of the solvent stream into the contacting column.

The method further can comprise passing the bottom product stream through one or more distillation columns configured for separating out one or more further components present in the bottom product stream in addition to the sulfurous material.

The multi-component feed stream can be sour natural gas.

The bottom product stream can contain at least a portion of any hydrogen sulfide and $C_1$ to $C_5$ hydrocarbons present in the sour natural gas.

The overhead vapor stream can contain a majority of methane present in the sour natural gas.

At least a portion of the fuel gas in the overhead vapor stream can be provided into a combustor of a power production unit.

A bottom liquid product stream from a first distillation column can be separated in a second distillation column into a vapor overhead product stream containing preferably less than 2 ppm of sulfurous material and a bottom liquid product stream containing preferably less than 10 ppm methane.

The vapor overhead product stream preferably can contain less than 100 ppm of $C_3$ and $C_4$ hydrocarbons.

A liquid bottom product stream from the second distillation column can be separated in a third distillation column into a bottom hydrocarbon liquid product stream containing preferably less than 2 ppm sulfurous material and a vapor overhead product stream containing substantially all of the remaining sulfurous material.

A feed stream to the third distillation column can be in the pressure range of about 10 bar to about 20 bar.

A liquid hydrocarbon additive stream from an external source (or from a recycle stream) can be introduced into a top section of the second distillation column at a stage located between a feed stage and a condenser. The liquid hydrocarbon additive stream can comprise mainly $C_4$ and greater hydrocarbons with a propane content less than about 2% molar.

A liquid hydrocarbon additive stream from an external source can be introduced into a top section of the third distillation column at a stage located between a feed stage and a condenser.

The liquid hydrocarbon additive stream can comprise mainly $C_4$ and greater hydrocarbons with a propane content less than 2% molar.

A liquid bottom product from the third distillation column can be processed to separate $C_4$ and greater hydrocarbons as at least one product and recycle at least a portion of the $C_4$ and greater hydrocarbons back as a hydrocarbon additive stream to one or both of the second and third distillation columns.

The bottom liquid product from the first distillation column can contain at least sufficient methane to ensure that greater than 75% molar and preferably greater than 90% molar of any ethane in the bottom product from the first column can be separated as part of the overhead vapor stream from the second distillation column.

Additional carbon dioxide can be added to the bottom product from the first distillation column so that the combined carbon dioxide and methane content of the bottom product from the first distillation column can be sufficient to ensure that greater than 75% molar and preferably greater than 90% molar of the ethane in the bottom product can be separated as part of the overhead vapor stream from the second column.

The vapor overhead stream from the second distillation column at near ambient temperature can be passed into a second membrane carbon dioxide separation unit to remove preferably at least 90% of the carbon dioxide prior to ethane separation.

The vapor overhead stream from the second distillation column can be introduced to a fourth distillation column to which also a liquid hydrocarbon additive stream and/or a liquid hydrocarbon recycle stream can be also introduced at a stage between a feed stage and a condenser such that a vapor overhead stream enriched in carbon dioxide can be withdrawn.

The liquid bottom product from the fourth distillation column can be introduced into a fifth distillation column in which a vapor overhead stream enriched in ethane and a liquid bottom product enriched in liquid hydrocarbon compounds can be withdrawn.

The compressed carbon dioxide permeate stream from the membrane carbon dioxide separator can be cooled to about −40° C. to about −55° C. and fed into a sixth distillation column in which a liquid bottom product enriched with carbon dioxide preferably with at least 80% molar purity and more preferably greater than 95% molar purity can be withdrawn.

The ambient temperature feed to the first membrane carbon dioxide separator can comprise the vapor overhead streams from the first and sixth columns plus the compressed permeate stream from the second membrane unit.

In further embodiments, the present disclosure can particularly provide systems for use separating a sulfurous material from a multi-component feed stream. The systems can include a combination of components as described herein, such as one or more contacting columns (e.g., distillation columns), one or more heat exchangers, one or more separation membranes, one or more compressors, one or more driers, one or more valves, and one or more lines for interconnecting the various components and providing for flow of various streams therethrough. Where the present disclosure describes the sulfur separation in relation to the separation methods, it is understood that the components described for carrying out the method can be utilized in forming a system for use in carrying out the separation.

BRIEF DESCRIPTION OF THE DRAWINGS

Figure 1:
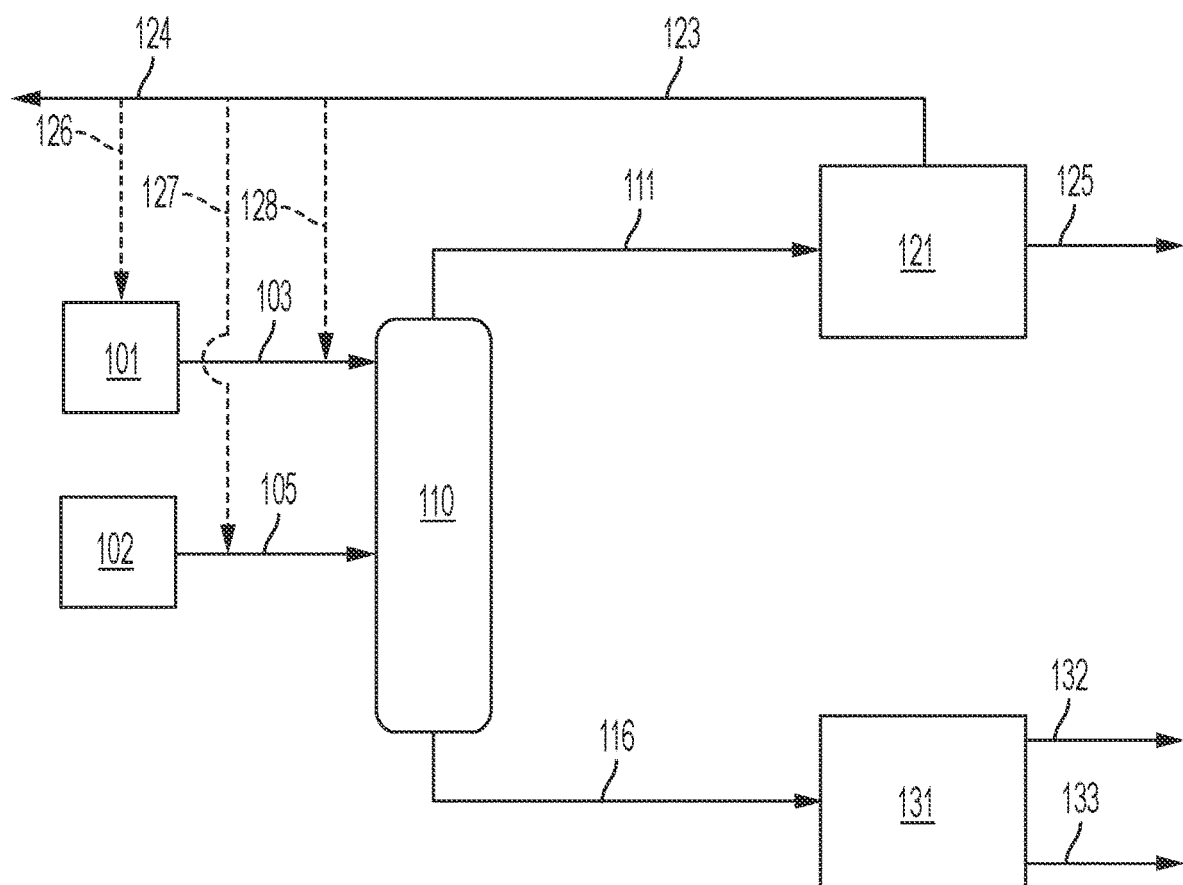
Figure 2:
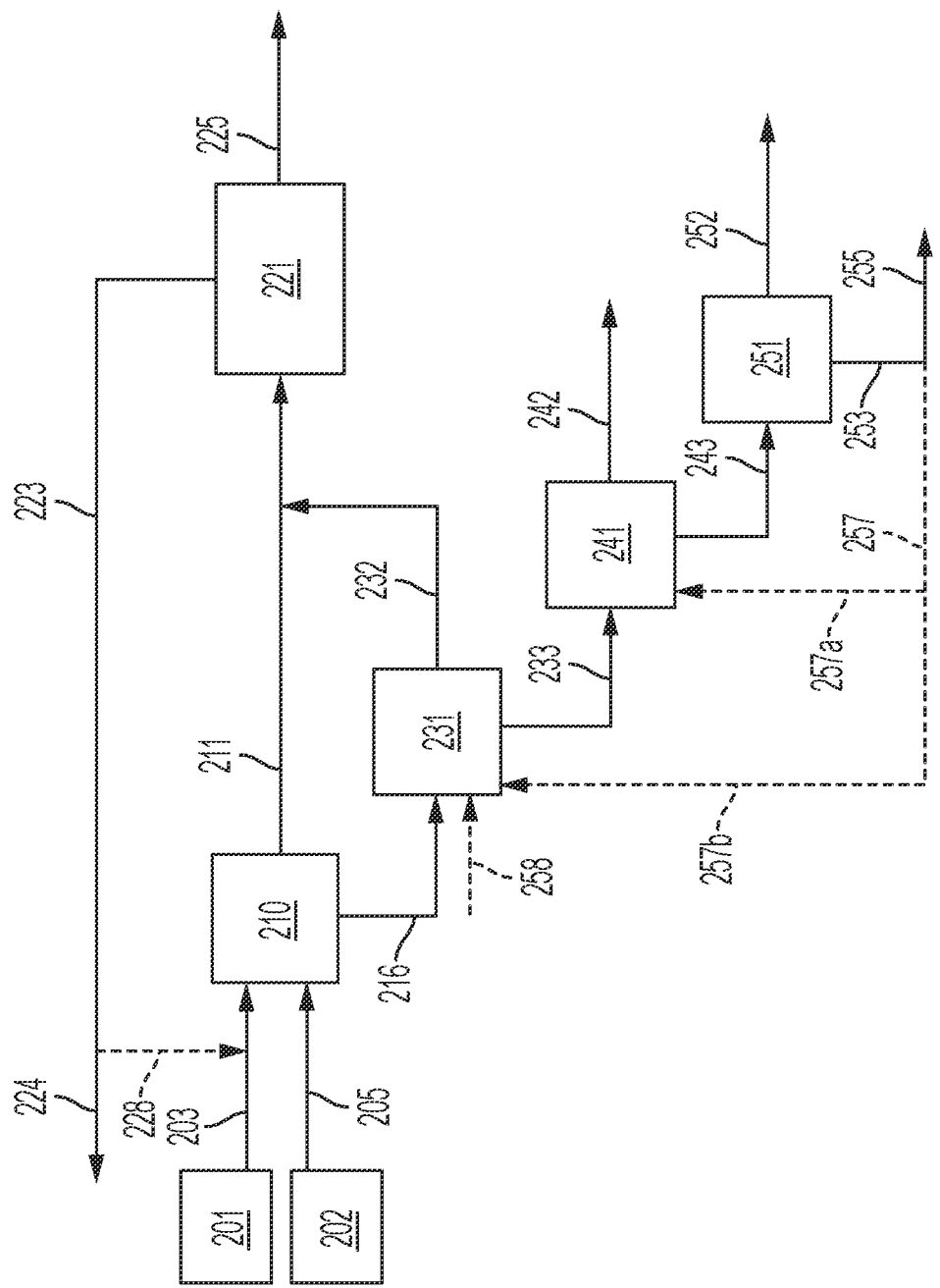
Figure 3:
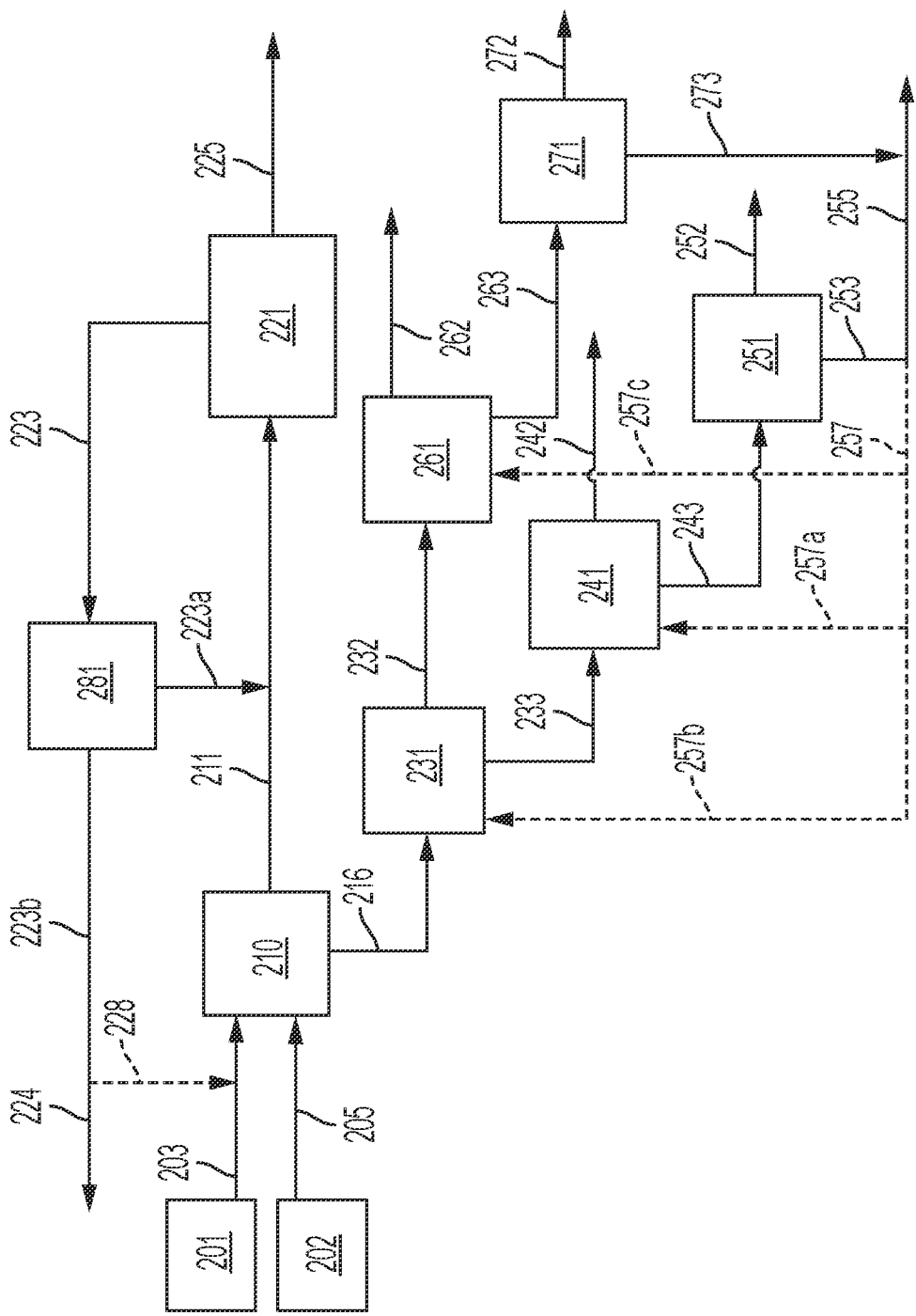
Figure 4:
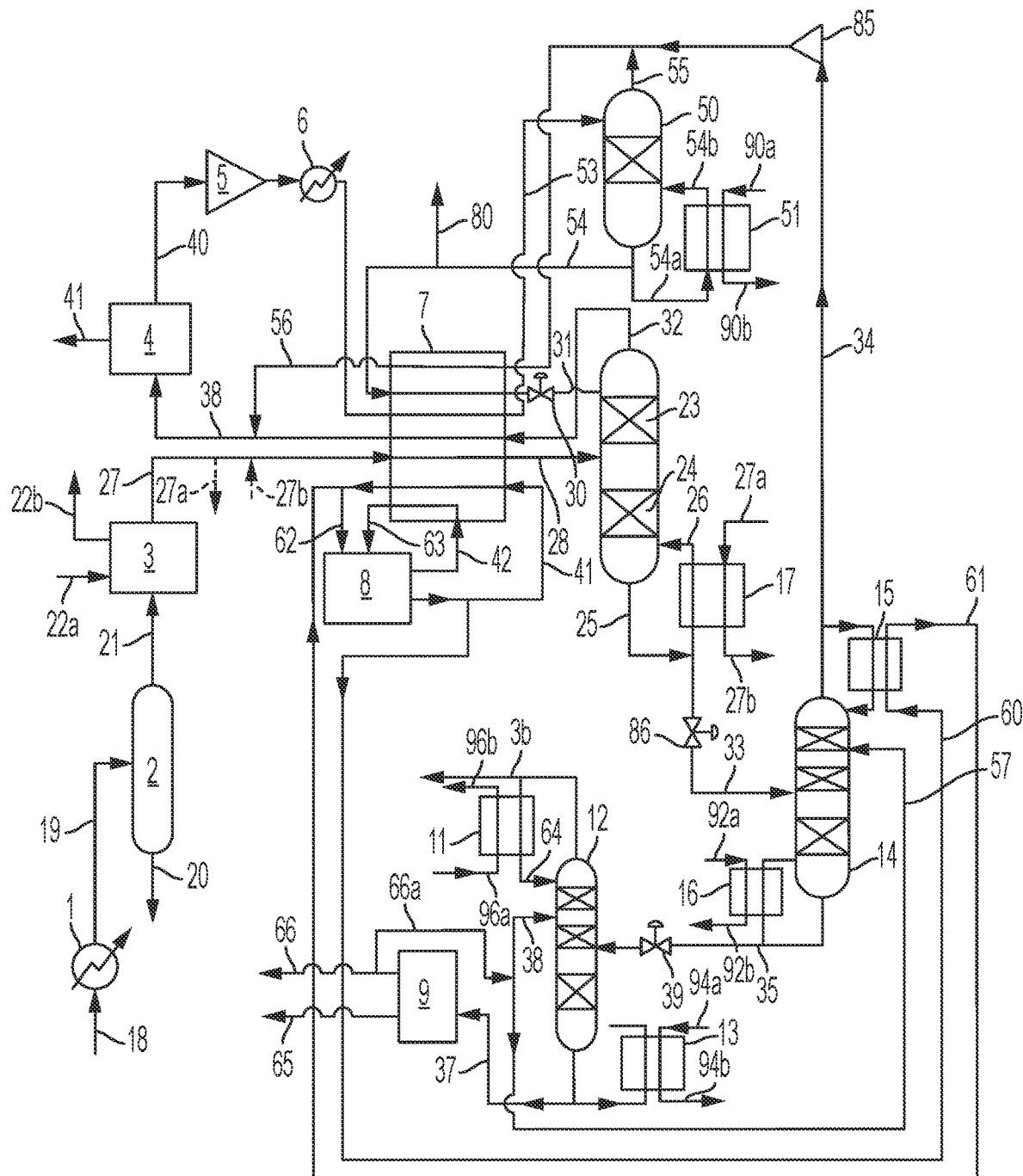
Figure 5:
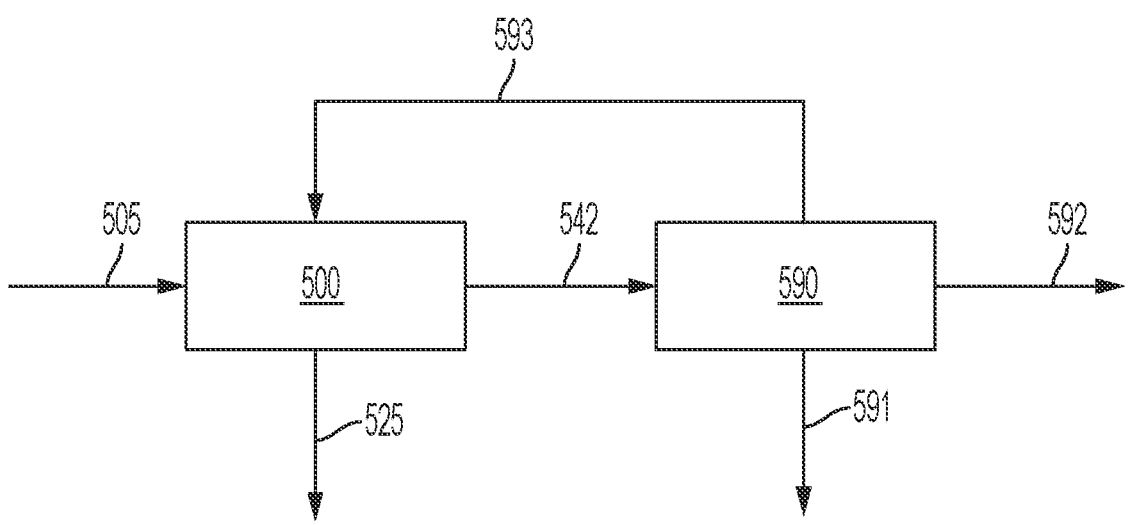
Figure 6:
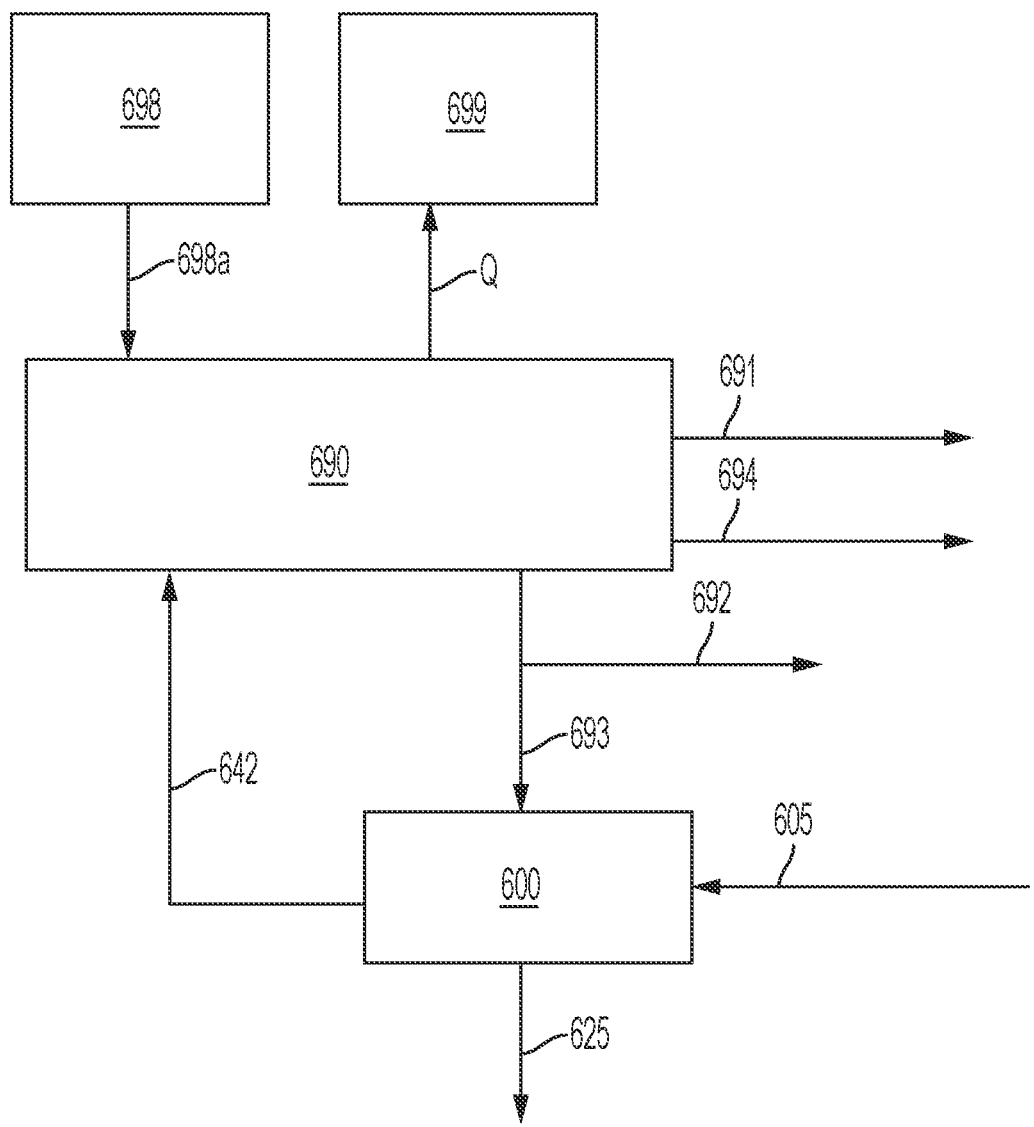
Figure 7:
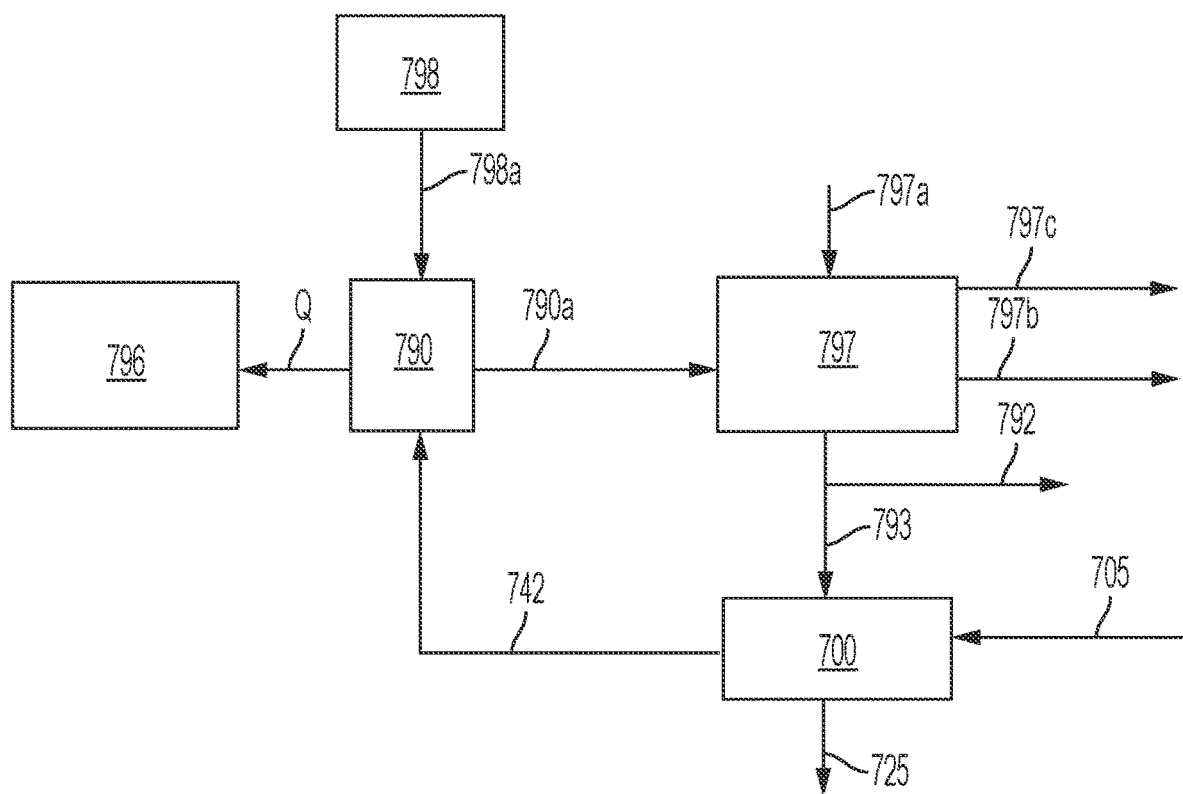
Figure 8:
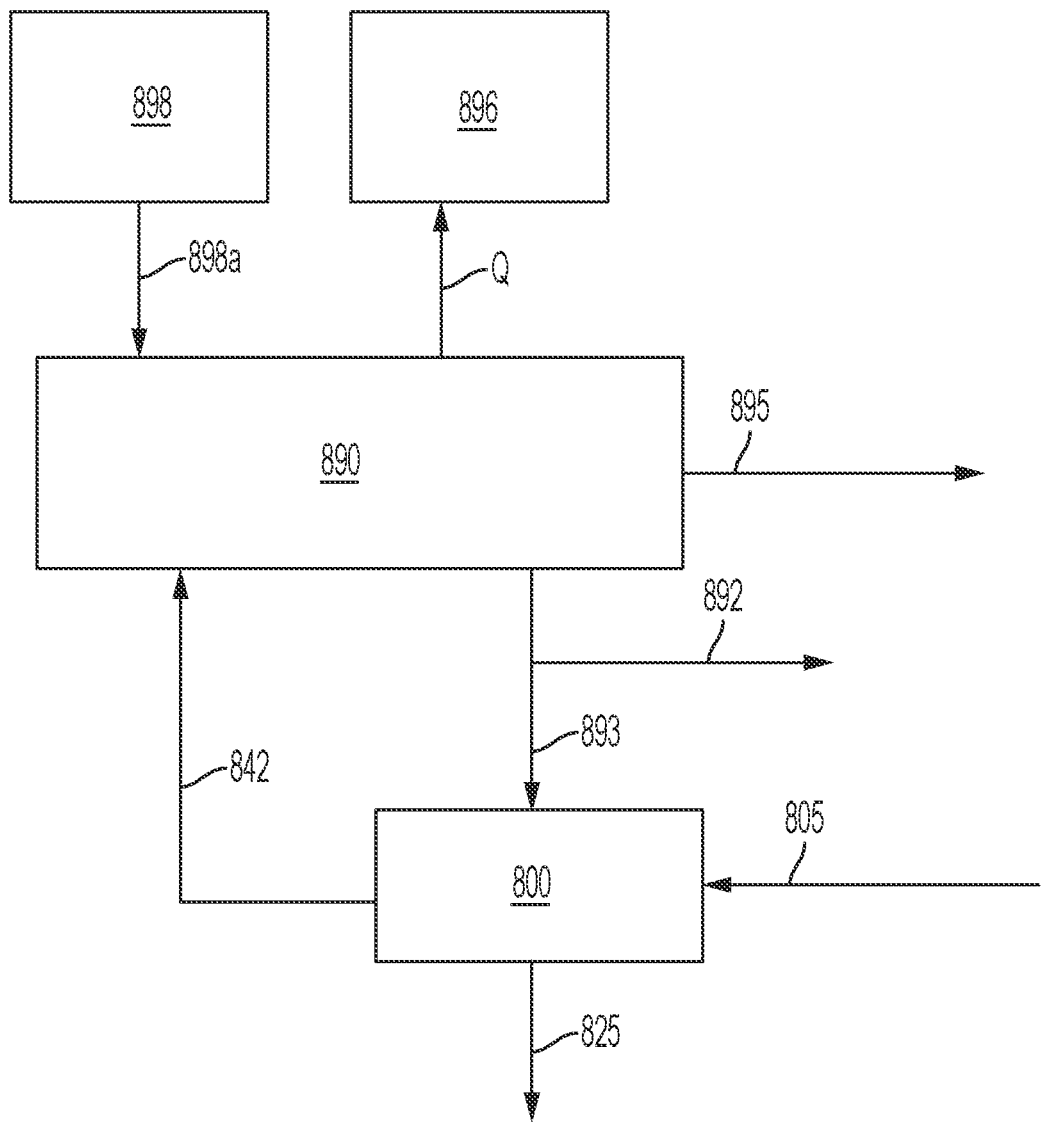

Having thus described the disclosure in the foregoing general terms, reference will now be made to the accompanying drawings, which are not necessarily drawn to scale, and wherein:

FIG. 1 is a flow diagram showing a system for separation of a sulfurous material from a multi-component feed stream according to embodiments of the present disclosure;

FIG. 2 is a flow diagram showing a system for separation of a sulfurous material from a multi-component feed stream according to further embodiments of the present disclosure;

FIG. 3 is a flow diagram showing a system for separation of a sulfurous material from a multi-component feed stream according to additional embodiments of the present disclosure;

FIG. 4 is a flow diagram showing a system for separation of a sulfurous material from a sour natural gas according to embodiments of the present disclosure;

FIG. 5 is a flow diagram showing a system for separation of a sulfurous material from a multi-component feed stream and processing the separated sulfurous material according to embodiments of the present disclosure;

FIG. 6 is a flow diagram showing a system for separation of a sulfurous material from a multi-component feed stream and processing the separated sulfurous material according to embodiments of the present disclosure;

FIG. 7 is a flow diagram showing a system for separation of a sulfurous material from a multi-component feed stream and processing the separated sulfurous material according to embodiments of the present disclosure; and FIG. 8 is a flow diagram showing a system for separation of a sulfurous material from a multi-component feed stream and processing the separated sulfurous material according to embodiments of the present disclosure.

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides systems and methods suitable for separation of sulfurous materials from mixed gas streams. More particularly, it has been found that carbon dioxide in its liquid form can be highly effective as a solvent for the absorption of sulfurous materials from a gaseous stream. As such, liquid carbon dioxide (or a further solvent as defined herein) can be used in some embodiments for removing sulfurous materials from multi-component feed streams that further include one or more fuel gases. This then can provide a highly cost effective means for purifying fuel gases (or other products) by removal of substantially all of the contaminating sulfurous materials that may be present therein.

A multi-component feed stream suitable for treatment according to the present disclosure can comprise at least two components—a gaseous component that is to be purified for provision as a product and a sulfurous material to be separated or removed from the multi-component feed stream. In some embodiments, the gaseous component to be purified can be a fuel gas. For example, methane or a mixture of methane and ethane may be the fuel gas. In such embodiments, the multi-component feed stream may thus be a natural gas mixture that contains methane and some content of higher carbon number hydrocarbons (e.g., $C_2$ to $C_5$). In some embodiments, the fuel gas may comprise carbon monoxide and/or hydrogen. For example, the fuel gas may be syngas. As such, reference herein to a fuel gas can mean any material that is suitable for use as a fuel and that is gaseous under its normal conditions. In some embodiments, a multi-component feed stream can include any one or a combination of the following components: methane, ethane, propane, butane, pentane, hexane, carbon monoxide, and hydrogen. Preferably, the multi-component feed stream comprises at least a gaseous component and thus, the multi-component feed stream may be referred to as a gaseous mixture.

The sulfurous material to be separated or removed from the multi-component feed stream beneficially can be substantially any sulfur-containing material since the solvent utilized according to the present disclosure can be configured to effect removal of substantially all sulfur-containing species from a gaseous source. For example, liquid carbon dioxide in particular can be effective to absorb and/or condense substantially all sulfur-containing species from a gaseous source. As such, sulfurous materials such as hydrogen sulfide ($H_2S$), carbonyl sulfide (COS), thiol-containing materials, carbon disulfide, and disulfide bond-containing compounds may be may be separated or removed from a multi-component feed stream according to embodiments of the present disclosure. It is understood that a thiol-containing material can be any organosulfur compound of the formula R-SH, wherein R is an alkyl or other organic substituent. A thiol-containing material may be referred to as a mercaptan. The sulfurous material to be removed is understood to be predominately in a gaseous form under removal conditions as described herein.

In an example embodiment, the present disclosure can relate to treatment of a sour gas, which is understood to be a natural gas or any other gas containing significant amounts of hydrogen sulfide. Sour gas may contain further acidic gases, such as carbon dioxide gas. Although the invention may be discussed herein, in example embodiments, in relation to treatment of a sour gas, it is understood that the disclosure extends to treatment of any multi-component feed stream containing a sulfurous material.

A multi-component feed stream suitable for treatment according to the present disclosure may contain at least 5 ppm, at least 10 ppm, at least 50 ppm, at least 100 ppm, at least 500 ppm, at least 1,000 ppm, at least 1%, or at least 2% of sulfurous materials on a molar basis. The multi-component feed stream likewise may contain other acid gases. In some embodiments, however, efficient removal of the sulfurous material may be improved when the multi-component feed stream contains a greater content of the sulfurous material than of other acid gases on a molar basis. In such cases, the liquid carbon dioxide in the solvent can preferentially remove the sulfurous material and more efficiently provide the purified fuel gas with substantially no sulfurous material remaining therein.

Referring generally to FIG. 1, a multi-component feed stream including at least a sulfurous material and a product gas (e.g., a fuel gas) can be processed to separate at least a portion of the sulfurous material from the product gas. Specifically, the multi-component feed stream can be injected through line 105 into a contacting column 110 from a multi-component feed stream source 102. As further described below, the multi-component feed stream may be subjected to one or more processing steps prior to injection into the contacting column 110. For example, the multi-component feed stream may be cooled to a temperature approaching the freezing point of carbon dioxide. As such, the multi-component feed stream in line 105 injected into the contacting column 110 may include a liquid fraction as well as a gaseous fraction. Preferably, a multi-component feed stream as described may comprise less than 50%, less than 40%, less than 30%, less than 20%, less than 10%, or less than 5% of a liquid fraction on a molar basis (e.g., in the range of about 0.1% to about 40%, about 0.1% to about 20%, or about 0.1% to about 10% of a liquid fraction on a molar basis). As such, the term gaseous mixture may be used to define the multi-component feed stream but should not be viewed as excluding fluid streams comprising as liquid fraction as well as a gaseous fraction since two-phase flow streams can be readily processed according to the present disclosure. For example, in some embodiments, a multi-component feed stream including a liquid fraction and a gaseous fraction may be injected directly into the contacting column 110 using a gallery tray, chimney tray, and/or similar internal structural components that are commonly utilized for accommodating two-phase injection streams. As another example, a multi-component feed stream that includes a liquid fraction and a gaseous fraction may be flashed prior to injection into contacting column 110. In further examples, the multi-component feed stream containing a liquid fraction and a gaseous fraction may be separated by fraction with the gaseous fraction being injected into a middle section of the contacting column 110, and the liquid fraction bypassing the contacting column 110 and being mixed with the liquid bottom stream exiting the contacting column for injection into a second column (e.g., second contacting column 221 in FIG. 2).

The multi-component feed stream in line 105 preferably is contacted with a solvent within the contacting column 110. The contact between the multi-component feed stream and the solvent can be characterized as a reflux or other intimate mixing, including but not limited to providing for a counter-current flow of the multi-component feed stream against the solvent. As illustrated in FIG. 1, the solvent from solvent source 101 is injected through solvent line 103 into the contacting column 110. It is understood, however, that at least a portion of the solvent from line 103 may be injected into the multi-component feed stream source 102 and/or the multi-component feed stream line 105 so that removal of the sulfurous material from the multi-component feed stream may begin prior to injection into the contacting column 110. For example, the multi-component feed stream entering the contacting column 110 from line 105 may comprise up to about 50%, up to about 40%, up to about 30%, up to about 20%, up to about 10%, or up to about 5% by weight of the solvent based on the total weight of the fluid passing through line 105 into the contacting column. More particularly, the multi-component feed stream entering the contacting column 110 from line 105 may comprise about 0.1% to about 40%, about 0.2% to about 20%, about 0.5% to about 15%, or about 1% to about 10% by weight of the solvent based on the total weight of the fluid passing through line 105 into the contacting column. When solvent is included in the line 105 with the multi-component feed stream, it is understood that the solvent still may pass independently into the contacting column 110 through solvent line 103.

The multi-component feed stream source 102 and/or the multi-component feed stream in line 105 may comprise at least some content of carbon dioxide. For example, the multi-component feed stream source 102 may comprise gaseous carbon dioxide, such as in an amount of about 0.01% to about 20%, about 0.05% to about 10%, about 0.1% to about 5%, or about 0.5% to about 3% on a molar basis. In further examples, as described above, liquid carbon dioxide from the solvent may be added to the multi-component feed stream prior to injecting of the multi-component feed stream into the contacting column. In some embodiments, prior to said injecting of the multi-component feed stream into the contacting column, the multi-component feed stream can comprise carbon dioxide (gaseous or liquid) in an amount of at least 0.01%, at least 0.05, at least 0.1%, at least 0.5%, at least 1%, or at least 2% on a molar basis. As otherwise described herein, the multi-component feed stream in line 105 may be cooled to a substantially low temperature prior to injecting into the contacting column 110. At such temperature, carbon dioxide in the multi-component feed stream may be in the liquid form (either from previously present gaseous carbon dioxide being liquefied or from liquid carbon dioxide from the solvent being injected into the multi-component feed stream stream). It is understood, however, that at least a portion of the gases originally present in the multi-component feed stream source 102 may remain gaseous. As such, the multi-component feed stream in line 105 may be in a mixed form wherein at portion of the mixture is liquid and a portion of the mixture is gaseous. In preferred embodiments, a majority (i.e., greater than 50%) of the multi-component feed stream (on a molar basis) remains in a gaseous form when injected into the contacting column 110.

As discussed herein, liquid carbon dioxide has been found to be a particularly useful solvent for the removal of sulfurous materials from a multi-component feed stream. It is understood that other suitable solvents for gaseous sulfurous materials may be combined with the liquid carbon dioxide. In example embodiments, it can be beneficial for the solvent to comprise substantially only liquid carbon dioxide or, at a minimum to exclude other materials. For example, in some embodiments, the solvent can consist of liquid carbon dioxide or may consist essentially of liquid carbon dioxide and thus exclude any other liquid solvent. In other embodiments, the solvent can comprise at least 60%, at least 80%, at least 95%, at least 99%, or at least 99.9% on a molar basis liquid carbon dioxide. In particular, it can be beneficial for the solvent to substantially exclude any sulfurous material (i.e., meaning that the solvent includes less than 2 ppm molar of any sulfurous material). More preferably, the solvent can be completely free of any sulfurous material. The solvent particularly can be a material that is adapted to or configured to dissolve, condense, or otherwise cause the sulfurous material to separate from further components of the multi-component feed stream and exit the contacting column with a liquid stream while the remaining portions of the multi-component feed stream exits the contacting column with a gaseous stream. As such, any solvent that is adapted to or configured to cause separation of the sulfurous material under operation conditions (e.g., pressure and/or temperature) as otherwise defined herein for the contacting column 110 may be utilized.

The solvent introduced to the contacting column 110 is preferably at a temperature and pressure such that substantially all of the carbon dioxide that may be present in the solvent is in a liquid state. Likewise, it can be preferred for any solvent material that is utilized to be in a liquid state when introduced into the contacting column 110. Moreover, it is preferable for the solvent to be introduced to the contacting column 110 at a temperature and pressure so that the carbon dioxide is substantially close to its freezing point while still remaining liquid. The solvent injected into the contacting column 110 thus is preferably at a temperature of about −10° C. to about −55° C., about −25° C. to about −55° C., or about −40° C. to about −55° C. In some embodiments, the solvent injected into the contacting column 110 is at a temperature that is within about 2° C., within about 3° C., within about 4° C., within about 5° C., within about 10° C., or within about 20° C. of the freezing point of the solvent (or any portion of the solvent that has the highest relative freezing point). In preferred embodiments, the solvent injected into the contacting column 110 is at a temperature that is within about 2° C., within about 3° C., within about 4° C., within about 5° C., within about 10° C., or within about 20° C. of the freezing point of carbon dioxide. The contacting column 110 likewise may be operated within any of the above temperature ranges. Preferably, the contacting column 110 is operated such that liquid carbon dioxide in the solvent (or any other solvent material) does not freeze to a solid form at any point within the contacting column. Thus, the operation of the contacting column 110 can be substantially free of any solid carbon dioxide and/or can be substantially free of any solid solvent component. In particular, carbon dioxide is not solidified (i.e., frozen) and then liquefied (i.e., melted) within the contacting column 110. Rather, the solvent (and particularly carbon dioxide) remains liquid within the contacting column 110 so as to maximize the ability to remove the sulfurous material from the multi-component feed stream. The lowest possible operating temperature without causing solidification of the carbon dioxide (or any further solvent component) in any one or more of the solvent, the contacting column 110, and the overhead vapor stream exiting the contacting column preferably is used. In one or more embodiments, the multi-component feed stream injected into the contacting column is at a temperature within one or more of the ranges already described above for the solvent and the operation of the contacting column 110. It is understood that the solvent may include a fraction that is in a gaseous state when injected into the contacting column 110. It is preferred, however, for a majority of the solvent to be in a liquid state to provide for separation of the sulfurous material. Thus, operating conditions of the contacting column and pre-treatment of the solvent may be such that the solvent comprises less than 50%, less than 25%, less than 10%, less than 5%, less than 1%, or less than 0.5% of a gaseous fraction on a molar basis (e.g., in the range of about 0.01% to about 40%, about 0.01% to about 10%, or about 0.01% to about 1% of a gaseous fraction on a molar basis) when injected into the contacting column. As such, greater than 50%, greater than 75%, greater than 90%, greater than 95%, greater than 99%, or greater than 99.5% of the solvent (on a molar basis) may be in a liquid state when injected into the contacting column. More particularly, the solvent may comprise about 60% to about 99.99%, about 90% to about 99.99%, or about 95% to about 99.99% of a liquid fraction on a molar basis when injected into the contacting column.

In some embodiments, the solvent can contain a hydrocarbon content. As further described herein, at least a portion of the solvent may be a recycled stream and may include, for example, methane, such as in the range 0% to about 25% molar based on the overall concentration of the solvent stream. Preferably, any hydrocarbon content of the solvent stream will be maintained to be as low as possible. Likewise, any hydrocarbon material present in the solvent is preferably at the lowest temperature possible while remaining above the freezing temperature of the solvent. The temperature should be in practice about 2° C. to about 10° C. above the freezing temperature and preferably about 3° C. to about 5° C. above the freezing temperature of the solvent stream. The solvent preferably is provided to the contacting column 110 in a sufficient concentration relative to the multi-component feed stream such that an overhead vapor stream in line 111 that is produced will have a sulfurous material concentration below 2 ppm. The concentration of sulfurous material in the overhead vapor stream in line 111 can vary as desired. For example, the overhead vapor stream in line 111 can have a concentration of sulfurous material of less than 2%, less than 1%, less than 0.1%, less than 100 ppm, less than 10 ppm, or less than 2 ppm on a molar basis. The solvent stream preferably will have the lowest possible hydrocarbon content so as to maximize capture efficiency of the sulfurous material by the solvent, minimize the concentration of hydrocarbons in the column overhead vapor stream in line 111, and minimize any problems that may be associated with carbon dioxide removal downstream. Optionally the contacting column 110 may be equipped with an overhead condenser and a reboiler if desired to mitigate such issues. Various implementations of condensers and reboilers are described in relation to the appended Example, and it is understood that any one or any combination of contacting columns (e.g., distillation columns) described herein may be equipped with one or both of a condenser and a reboiler.

The solvent and/or the multi-component feed stream may be subjected to one or more treatments prior to injection into the contacting column 110 to achieve one or more desired physical conditions for the respective streams. For example, one or both of the solvent and the multi-component feed stream may be cooled to the desired temperature range. As illustrated in FIG. 1, the solvent leaving the solvent source 101 and the multi-component feed stream leaving the multi-component feed stream source 102 are already at the desired temperature. If cooling is to be applied, however, any refrigeration or other heat exchange suitable to cool one or both streams to the desired temperature range (e.g., to a temperature close to about −56° C.) may be used. Example embodiments of cooling units suitable according to the present disclosure are more specifically described in relation to Example 1. In particular, a heat exchange system used for cooling one or both of the solvent and the multi-component feed stream may also be utilized to heat the overhead vapor stream in line 111 and/or one or more further gas stream as otherwise discussed herein to a greater temperature, such as to near ambient temperature. When a heat exchanger is used (see heat exchanger 7 in the appended Example), any deficiency of refrigeration can be provided by a suitable system, such as a closed cycle refrigeration loop (see refrigeration unit 8 in Example 1) with a working fluid capable of providing refrigeration at the required low temperature level. Optionally the refrigeration loop can provide refrigeration at two or more temperature levels. Optionally the refrigeration can be provided by a refrigerant fluid comprised of pure carbon dioxide or carbon dioxide mixed with other gases (e.g., methane) evaporating at a temperature level close to its freezing temperature. If desired, any refrigeration means known in the art may be utilized. For example, suitable combinations of expansion and recompression may be carried out to provide cooling, and this can encompasses systems and methods designed to utilize the Joule-Thomson Effect.

More particularly, prior to injecting the multi-component feed stream in line 105 and/or the solvent in line 103 into the contacting column 110, one or both of these streams may be passed through a heat exchanger against at least a portion of an overhead vapor stream 111 that is withdrawn from the contacting column 110 so that the overhead vapor stream is heated and one or both of the multi-component feed stream and the solvent stream is cooled. In one or more embodiments, refrigeration for one or both of the multi-component feed stream in line 105 and the solvent in line 103 can be provided with a refrigeration system (e.g., a closed cycle loop) using a suitable refrigerant. In this manner, one or more streams of the liquid refrigerant can be evaporated in the heat exchanger (e.g., at the same or at different temperature levels) to maintain a heat balance thereof. In some embodiments, the liquid refrigerant can comprise liquid carbon dioxide.

Preferably, the carbon dioxide that utilized in the liquid solvent in line 103 can be provided at a pressure and a temperature so that the carbon dioxide is at a desired density range. For example, the carbon dioxide can have a density of about 0.6 Kg/L or greater, about 0.7 Kg/L or greater, or about 0.75 Kg/L or greater. To this end, carbon dioxide that is passed through a heat exchanger to be cooled prior to entry into the contacting column 110 may be at a pressure that is substantially close to or above the critical pressure of carbon dioxide and that is substantially close to ambient temperature. More particularly, the carbon dioxide can have a pressure in the range of about 50 bar to about 85 bar or about 65 bar to 75 bar. The pressure of the solvent stream can be reduced to the column pressure in a suitable valve following cooling in the heat exchanger (see the valve 31 in FIG. 4). Alternatively, the solvent stream can be provided at a pressure slightly higher than the operating pressure of the contacting column 110 and be cooled to the desired temperature near its freezing point in a refrigeration heat exchanger.

In one or more embodiments, the multi-component feed stream may be pre-treated to separate any liquid phase water and optionally hydrocarbons above $C_4$. The so treated multi-component feed stream may then be dried to a dew-point that is below the operating temperature of the contacting column 110, preferably below a dew point of about −56° C. or below a dew point of about −60° C. Such drying may be carried out, for example, in a thermally regenerated desiccant drier. The solvent stream likewise can be provided with a dew-point in one or more of the above-noted ranges. The dried crude multi-component feed stream and the dried solvent stream are then cooled in the heat exchanger to the low temperature required for operation of the contacting column 110. As seen in FIG. 1, the solvent leaving the solvent source 101 and the multi-component feed stream leaving the multi-component feed stream source 102 may already have the desired dew-point. Alternatively, referring to the appended Example, the present system and method may include carrying out the desired drying in order to achieve the desired dew-point.

In some embodiments, further or alternative components may be utilized for providing one or both of the solvent in line 103 and the multi-component feed stream in line 105 to the contacting column 110 at the appropriate temperature and/or pressure range. For example, the multi-component feed stream from multi-component feed stream source 102 may be compressed (e.g., to a pressure of at least 60 bar) in an intercooled multi-stage compressor prior to being dried in a drying bed (e.g., a bed packed with appropriate desiccant material, such as molecular sieves or zeolites), preferably to a dew point of substantially close to −60° C. The dried stream may then be reduced in pressure by passage through a first valve before passage through a heat exchanger. Finally, the stream may be further expanded in a second expansion valve to form a stream at a temperature near the carbon dioxide triple point temperature of about −56.4° C. This stream (i.e., either or both of the solvent stream and the multi-component feed stream) can then be fed to a contacting column as otherwise described herein. The cool overhead vapor from the contacting column 110 can be utilized as a source of refrigeration for one or more further streams, such as in the main heat exchanger used in the system as described (see heat exchanger 7 in the appended Example).

The contacting column 110 can be any structure that allows for injection of the necessary streams and provide for contacting therein of the injected streams. For example, the contacting column 110, in some embodiments, may be a distillation column and thus may include any number of plates as may be present in a typical fractionating distillation column. Alternatively, the contacting column 110 may contain any suitable packing material that typically may be utilized in fractionating columns. The contacting column 110 may be characterized as a counter-current contacting column wherein an injected gaseous stream passes upward for contacting an injected liquid stream that passes downward. The contacting column 110 preferably may be adapted to or configured to effectively handle a two-phase feed stream. For example, the contacting column 110 may be adapted to or configured to provide for any one or more of the following: flash a feed stream in a flash vessel prior to the entrance to the column; use a gallery tray or chimney tray; include heating elements such as heating coils or tubing containing heating fluids such as steam or other process streams in internal sections of the column in order to adjust the boil-up within the column and obtain desired separation performance over its top and bottom products.

The operating pressure of the contacting column 110 preferably is below the critical pressure of the fluids in the contacting column at all points. In example embodiments, the contacting column can operate at a pressure in the range of about 7 bar to about 100 bar, about 10 bar to about 70 bar, about 7 bar to about 60 bar, about 30 bar to about 50 bar, or about 20 bar to about 50 bar. Likewise, the solvent stream and/or the multi-component feed stream may be injected to the contacting column 110 at a pressure within one or more of the ranges noted above.

In practice, the multi-component feed stream from line 105 contacts liquid carbon dioxide from the solvent in line 103 within the contacting column 110 to achieve the desired removal of the sulfurous material from the mixed gas stream. As noted above, a portion of the solvent stream may be combined with the multi-component feed stream prior to injection into the contacting column 110; however, it is understood that at least a portion of the transfer of the sulfurous material from the multi-component feed stream to the solvent is carried out within the contacting column 110. In particular, the sulfurous material is transferred from the multi-component feed stream to the liquid carbon dioxide within the contacting column, and two separate streams may be withdrawn therefrom. A bottom product stream 116 can be withdrawn from a lower portion of the contacting column 110, the bottom product stream containing at least a portion of the sulfurous material from the multi-component feed stream, and an overhead vapor stream in line 111 can be withdrawn from an upper portion of the contacting column, the overhead vapor stream containing at least a portion of the product gas from the multi-component feed stream. In one or more embodiments, the bottom product stream 116 can include substantially all of the sulfurous material from the multi-component feed stream. In embodiments wherein the multi-component feed stream is a natural gas, the bottom product stream 116 may likewise include substantially all of the $C_3$ or higher hydrocarbons that are present as well as a minor amount of gaseous carbon dioxide and methane and/or ethane.

In one or more embodiments, a re-boiler (e.g., a heat exchanger) may be utilized at the base of the contacting column 110 to ensure that the bottom product stream 116 from the contacting column contains substantially all of the sulfurous material from the multi-component feed stream. In the case where the multi-component feed stream includes a natural gas, the use of the re-boiler can further ensure that the product stream 116 contains substantially all of the higher hydrocarbons (e.g., $C_3$ to $C_5$ or greater) present in the multi-component feed stream. An example embodiment of a re-boiler is described in Example 1. The use of the reboiler can also be useful to ensure that the overhead vapor stream in line 111 from the contacting column 110 contains a majority of the gaseous carbon dioxide from the multi-component feed stream and, in cases where the multi-component feed stream is a natural gas, to ensure that the overhead vapor stream contains a majority of the methane and ethane present from the multi-component feed stream. The re-boiler may be separate component from the contacting column 110 or may be integrally formed with the contacting column. The heating stream for the re-boiler can come from any suitable source. In some embodiments, at least a portion of the multi-component feed stream is passed through the re-boiler prior to injecting into the contacting column 110. In this manner, the multi-component feed stream can provide heating to the re-boiler while being cooled prior to entry into the contacting column 110.

In embodiments wherein the multi-component feed stream is a natural gas, the overhead vapor stream in line 111 preferably comprises substantially no hydrocarbons greater than $C_2$. For example, the overhead vapor stream in line 111 exiting the contacting column 110 preferably includes less than 1%, less than 0.1%, less than 100 ppm, less than 10 ppm, or less than 5 ppm of $C_3$, $C_4$, or $C_5$, on a molar basis, each individually or in total.

The overhead vapor stream in line 111 exiting the contacting column 110 may be passed through one or more units for further treatment. An overhead vapor treatment unit 121 is shown in FIG. 1 and may include one or more treatment sections. In some embodiments, it can be useful to first heat the vapor stream, such as to near ambient temperature. This can be done utilizing dedicated heating (e.g., as a component of the overhead vapor treatment unit 121) or utilizing heat available from another unit. For example, the overhead vapor stream in line 111 may be passed through the heat exchanger that is utilized for cooling of one or both of the solvent stream and the multi-component feed stream. This utilizes heat withdrawn from one or both of the original solvent stream and the original mixed gas stream in order to heat the overhead vapor stream.

The overhead vapor stream in line 111 may be subjected to one or more separation steps in order to separate the vapor stream into desired constituents. The overhead vapor treatment unit 121 thus may include one or more separation units. For example, when the mixed gas stream 105 is a natural gas stream, the overhead vapor stream in line 111 may comprise at least methane and gaseous carbon dioxide. Accordingly, it can be beneficial to separate at least a majority of the gaseous carbon dioxide from the methane to provide a high purity methane stream. Such concept can be applied equally to any overhead gas stream to the extent that it includes multiple components. The concentration of sulfurous material in the product gas stream in line 125 can vary as desired based upon the efficiency of the removal of sulfurous material in the contacting column 110. For example, the product gas stream (e.g., a fuel gas) in line 125 can have a concentration of sulfurous material of less than 2%, less than 1%, less than 0.1%, less than 100 ppm, less than 10 ppm, or less than 2 ppm on a molar basis. This low concentration of the sulfurous material can be particularly beneficial since the product can, in one or more embodiments, be a fuel gas, and at least a portion of such fuel gas can be provided into a combustor of a power production unit.

In one or more embodiments, the overhead vapor treatment unit 121 through which the overhead vapor stream in line 111 can be passed can comprise a single stage or multi-stage (e.g., two stage) membrane gas separator. Any suitable membrane gas separator may be utilized such as, for example, a UOP Separex™ Membrane System that is particularly designed for separation of acid gases and water from natural gas. In an example wherein the overhead vapor stream in line 111 is derived from a sour natural gas as the multi-component feed stream source 102, the use a membrane separator can be effective to separate the bulk of the gaseous carbon dioxide from the product natural gas stream (which is predominately methane) which leaves the membrane system as the non-permeate high pressure stream. This is further described in relation to Example 1. The thus purified product gas stream preferably has a carbon dioxide content that is within a desirably low range, such as less than 5%, less than 4%, less than 3%, or less than 2% carbon dioxide content on a molar basis. The presence of methane and ethane in the gaseous carbon dioxide stream exiting the membrane separator can be minimized by using a two stage membrane unit. The number of membrane separators utilize can be chosen based upon the carbon dioxide content of the original multi-component feed stream source 102. Further reductions in the methane content of the separated gaseous carbon dioxide can depend on the economics of recovering more purified natural gas. In one embodiment, for example, the permeate stream from a single stage membrane unit may be compressed to a pressure that is greater than the operating pressure of the contacting column and then cooled in the heat exchange system to a temperature in the range that is slightly above the freezing temperature of carbon dioxide (e.g., about 2° C. to about 10° C. or about 3° C. to about 5° C. above the freezing temperature of carbon dioxide). The gas stream may then be fed to a second distillation column which has a reboiler and optionally an overhead condenser. The function of this column can be to separate methane from carbon dioxide in a section of stages below the feed point to produce a purified carbon dioxide liquid bottom product stream containing less than 10% methane and typically about 1% to 6% methane, which provides both the net carbon dioxide product stream and, following cooling, the liquid carbon dioxide reflux to the contacting column.

As illustrated in FIG. 1, the overhead vapor stream in line 111 can be treated in the overhead vapor stream treatment unit 121 to provide at least a carbon dioxide permeate stream 123 and a gas product stream 125. Since the carbon dioxide permeate stream 123 preferably contains less than 2 ppm of the sulfurous material, the carbon dioxide permeate stream can be recycled to supply at least a portion of the carbon dioxide in the solvent stream. As such, the carbon dioxide permeate stream 123 can provide one or more of a carbon dioxide product 124, a carbon dioxide feed 126 to the solvent source 101, a carbon dioxide feed 127 to the multi-component feed stream line 105, and a carbon dioxide make-up feed 128 to the solvent line 103. Preferably, the carbon dioxide can be compressed and cooled to near ambient temperature before being combined with the solvent. In further embodiments, at least a portion of the compressed carbon dioxide permeate stream in line 123 can be cooled substantially closed to its freezing point, such as through passage through a heat exchanger as further described herein (see, for example, heat exchanger 7 in the appended Example). The carbon dioxide permeate stream can be cooled, for example to a temperature of about −20° C. to about −55° C., about −30° C. to about −55° C., or about −40° C. to about −55° C. The cooled carbon dioxide permeate can then be injected into a distillation column (see column 50 in the appended Example), and a liquid bottom product that is enriched in carbon dioxide (e.g., at least 80%, at least 85%, at least 90%, or at least 95% pure on a mole basis) can be withdrawn from the distillation column. With reference to FIG. 1, the withdrawn liquid carbon dioxide stream can be the stream provided in one or both of lines 126 and 128, and this liquid carbon dioxide stream can account for a majority of the solvent provided in line 103 to the contacting column 110.

Beneficially, in one or more embodiments, the present systems and methods can operate with internal recycle of carbon dioxide at substantially low concentrations of carbon dioxide in the multi-component feed stream since substantially the only consumption of carbon dioxide in the process is the content of carbon dioxide that remains in the product gas stream exiting the membrane separator. Any net carbon dioxide product 124 produced from excess carbon dioxide in the multi-component feed stream can be removed for disposal. Such produced carbon dioxide can be used for a variety of end purposes, such as a fluid for enhanced oil recovery, or sequestered in a geologic formation. In some embodiments, the net carbon dioxide may be used as at least part of the fuel feed stream to a $CO_2$ power production cycle where the methane content would contribute to the fuel requirement. The carbon dioxide derived from both the excess carbon dioxide and the carbon in the methane fraction would be delivered at 100% recovery and all the heat of combustion of the minor methane content would be utilized. Other alternative options to control the carbon dioxide content of the gaseous product stream may include an absorption-based system such as amine process or other types of carbon dioxide removal apparatus solely or in any combination with first and second option explained above. For example, a one-stage membrane followed by an amine process may be implemented. A downstream amine absorber may be particularly useful when a purified natural gas product stream is expected to be further refrigerated in an LNG plant and carbon dioxide content of 50 ppm or less is desired.

The bottom product stream in line 116 may be further processed as desired to separate the stream into one or more of its constituents, and such treatment can vary depending upon the composition of the original multi-component feed stream that is introduced to the contacting column 110. As illustrated in FIG. 1, the bottom product stream in line 116 may be further processed in the bottom product separation unit 131, which may comprise a plurality of separate components. In particular embodiments, the bottom product stream in line 116 may be passed through one or more further contacting columns (e.g., distillation columns) to sequentially separate the stream into individual fractions that each predominately comprises a desired component of the bottom product stream. Separation(s) carried out using the bottom product separation unit 131 can result in the formation of at least two exiting streams. Specifically, stream 132 can comprise at least carbon dioxide, and stream 133 can comprise at least sulfurous material.

In some embodiments, the bottom product separation unit 131 can be adapted to or configured to carry out a Claus process wherein sulfur compounds can be converted into elementary sulfur. In some embodiments, the bottom product separation unit 131 can be adapted to or configured to carry out process steps wherein sulfur compounds are converted into concentrated sulfuric acid. In some embodiments, the bottom product separation unit 131 can be adapted to or configured to carry out sulfur combustion with flue gas desulfurization wherein sulfur compounds are converted into gypsum. In some embodiments, the bottom product separation unit 131 can be adapted to or configured to carry out mineral carbonation storage wherein the carbon dioxide and hydrogen sulfide may be mixed with further compounds.

The separation(s) carried out using the bottom product separation unit 131 can be illustrated using an example wherein the original multi-component feed stream source 102 is a sour natural gas stream comprising at least methane, $C_2$ and greater hydrocarbons, gaseous carbon dioxide, and hydrogen sulfide. In such example, the separation sequence can be designed to provide a hydrogen sulfide stream that preferably contains less than 1% $CO_2$ content and also provide a hydrocarbon stream (e.g., containing $C_3$ or greater hydrocarbons), preferably with less than 2 ppm hydrogen sulfide content. This example is further discussed below with reference to FIG. 2 and FIG. 3.

Referring to FIG. 2, sour natural gas can be injected through line 205 into a first contacting column 210 from a sour natural gas source 202, and a liquid carbon dioxide containing solvent from solvent source 201 is injected through line 203 into the first contacting column. The first contacting column 210 can be characterized as a de-methanizer contacting column as the overhead vapor stream in line 211 exiting the first contacting column can comprise predominately methane (i.e., can contain a majority of methane present in the sour natural gas). In the system of FIG. 2, the overhead vapor stream treatment unit 221 can be a single stage membrane separator or a multi-stage membrane separator configured to provide a non-permeate stream exiting in line 225. The non-permeate steam derived from the sour natural gas can comprise substantially completely methane with a minor content of gaseous carbon dioxide and preferably substantially no hydrogen sulfide (e.g., less than 2 ppm hydrogen sulfide on a molar basis). The non-permeate, product gas stream in line 225 preferably has a gaseous carbon dioxide content of about 5% or less, about 4% or less, about 3% or less, or about 2% or less on a molar basis. The overhead vapor stream treatment unit 221 further can be configured to provide a permeate stream in line 223 that is formed predominately or substantially completely of carbon dioxide and preferably contains less than 2 ppm of the hydrogen sulfide. At least a portion of the, the carbon dioxide permeate stream in line 223 is withdrawn from the system as a carbon dioxide product stream in line 224. Optionally, a portion of the carbon dioxide permeate stream can be recycled to the solvent line 203 in carbon dioxide make-up feed line 228.

The bottom product stream in line 216 is further processed in a bottom product separation unit that comprises a plurality of components. The bottom product stream in line 216 can comprise at least a portion of any hydrogen sulfide and $C_1$ to $C_5$ hydrocarbons present in the sour natural gas. In some embodiments, the bottom product stream in line 216 can contain substantially all of any $C_3$ or greater hydrocarbons, substantially all of the hydrogen sulfide originally present in the natural gas, and varying amounts of $C_2$ (ethane) and carbon dioxide. In the illustrated embodiment, the bottom product stream in line 216 is first passed to a second contacting column 231 that can be configured to separate a majority or substantially all of the ethane that is present in the bottom product stream. The second contacting column, for example can be configured to include a reboiler and an overhead condenser to provide for re-boil and reflux within the second contacting column. Thus, the second contacting column may be characterized as being a de-ethanizer unit. As such, an ethane stream may exit the second contacting column 231 in line 232, and the ethane stream can comprise a majority of any carbon dioxide that did not leave the first contacting column 210 in the overhead vapor stream in line 211. More particularly, separation in the second contacting column 231 can be adapted to or configured to produce an overhead carbon dioxide rich vapor stream containing preferably less than 2 ppm hydrogen sulfide (on a molar basis), preferably less than 100 ppm $C_3$ or greater hydrocarbons (on a molar basis), and preferably greater than 50% molar of any ethane originally present in the sour natural gas source. The $C_2/CO_2$ stream leaving the second contacting column 231 in line 232 can be optionally further compressed and then combined with the overhead vapor stream in line 211 or injected directly into the overhead vapor stream treatment unit 221.

Depending on the composition of the sour natural gas source and the particular design of the first contacting column 210, the bottom product stream in line 216 can include some content of methane. For example, the bottom product stream in various embodiments can comprise 50% or less, 40% or less, 30% or less, 20% or less, 10% or less, 5% or less, or 1% or less methane on a molar basis. In some embodiments, the methane content of the bottom product stream in line 216 can be about 500 ppm or less, about 100 ppm or less, about 10 ppm or less, or less than 1 ppm on a molar basis. Several azeotrope mixtures may be formed in the second contacting column 231 such as $C_2/CO_2$, $C_2/H_2S$, and $C_3/H_2S$. Since it is highly desirable to separate a maximum quantity of the ethane into the top product stream exiting the second column in line 232, there preferably is a sufficient methane content in the column bottoms to ensure that the second contacting column 231 produces at least 75% and preferably greater than 90% of the ethane in the sour gas source 202 in the top product stream by adjusting the methane content of the stream entering the second contacting column in line 216. Optionally the first contacting column 210 can be adapted to or configured to provide a methane concentration in the bottom product stream of less than 5% molar, and a stream of liquid carbon dioxide can be added to the bottom product stream in line 216 to give a high recovery of ethane in the second contacting column overhead stream in line 232. Moreover, the second contacting column 231 can be adapted to or configured to provide the overhead vapor stream in line 232 with substantially no $C_3$ and/or $C_4$ hydrocarbons—i.e., about 500 ppm or less, about 200 ppm or less, about 100 ppm or less on a molar basis.

In some embodiments, the second contacting column 231 can be adapted to or configured to enhance ethane recovery in the overhead stream in line 232. For example, the second contacting column 231 can include one or more inputs for receiving a stream comprising $C_4$ hydrocarbons and optionally $C_3$ and/or $C_5$ or greater hydrocarbons. In some embodiments, the additive stream can comprise predominately $C_4$ or greater hydrocarbons and may comprise less than 5% or less than 2% (on a molar basis) of any $C_3$ hydrocarbons. As illustrated in FIG. 2, the hydrocarbon stream may be provided from an external source in line 258 and/or may be a recycle stream in line 257a taken from a further component of the system (such as described below). The addition of the higher hydrocarbon stream to second contacting column 231 can be useful to improve the separation of carbon dioxide and ethane from the sulfurous material and the $C_3$ and higher hydrocarbons mixture that is present in the liquid bottom stream in line 216. As a result, the overhead vapor stream in line 232 can be enriched in ethane and carbon dioxide and can include substantially no hydrogen sulfide (e.g., less than 2 ppm on a molar basis). Likewise, the liquid bottom stream in line 233 can be provided with substantially all of the hydrogen sulfide and the $C_3$ and greater hydrocarbons within the feed stream.

In one or more embodiments, a content of carbon dioxide may be added to the bottom product stream in line 216 exiting the first contacting column 210. Such addition can be suitable so that the combined carbon dioxide plus methane content of the bottom product stream in line 216 is sufficient to ensure that greater than 75% and preferably greater than 90% of any ethane present in the bottom product stream can be separated as part of an overhead vapor stream from the second distillation column 231, which can include a reboiler and/or an overhead condenser. In particular, the carbon dioxide content in the bottom product stream in line 216 may be adjusted as desired to be in the range of about 2% to about 50%, about 5% to about 45%, about 10% to about 40%, or about 20% to about 40% on a molar basis.

A liquid bottom product exits the second contacting column 231 in line 233 and is fed into a third contacting column 241, which can include a reboiler and/or an overhead condenser. The liquid bottom product in line 233 exiting the second contacting column 231 preferably includes substantially no methane—i.e., about 500 ppm or less, about 100 ppm or less, about 10 ppm or less, or less than 1 ppm on a molar basis. In some embodiments, the stream in line 233 can be at a pressure of about 5 bar to about 50 bar, about 7 bar to about 30 bar, or about 10 bar to about 20 bar. An overhead vapor stream exiting the third contacting column 241 in line 242 can comprise substantially all (e.g., at least 98%, at least 99%, at least 99.5%, or at least 99.9% on a molar basis) of the hydrogen sulfide from the original sour natural gas source 202. Removal of the hydrogen sulfide in the third contacting column 241 can include adding to the column a reflux stream comprising $C_4$ and greater hydrocarbons, which can be provided from an external source or optionally can be taken from an exit stream of a further component of the system (such as described below). The addition of the higher hydrocarbon stream to the third contacting column 241 allows substantially all of the $C_3$ and greater hydrocarbons from the sour natural gas source 202 to be delivered as a liquid bottom stream in line 243 that includes substantially no hydrogen sulfide (e.g., less than 2 ppm on a molar basis). In some embodiments, the overhead vapor stream in line 242 can be enriched in carbon dioxide—e.g., comprising about 0.1% to about 20%, about 0.5% to about 15%, or about 1% to about 10% carbon dioxide on a molar basis. The bottom product in line 243 exiting the third contacting column can be provided into a separation unit 251, which can function substantially as a de-propanizer and which can include a reboiler and/or an overhead condenser, and which can comprise, for example, a conventional natural gas liquids separation system. Processing in the separation unit can be effective to separate the liquid bottoms stream in line 243 into the various product streams, such as propane, butane, and light $C_5$ and greater hydrocarbons (e.g., naphtha). A propane stream can be withdrawn in line 252, and the $C_4$ and greater hydrocarbon stream can be withdrawn in line 253. As illustrated, all or a portion of the naphtha stream (or other mixture of $C_4$ and greater hydrocarbons) can be taken as a product stream in line 255. If desired, a portion of the $C_4$ and greater hydrocarbon stream in line 253 can be separated into line 257 as a recycle stream to provide part or all of a reflux stream—e.g., provided in line 257a into the third contacting column 241 and/or provided in line 257b into the second contacting column. The presently disclosed system thus can provide for highly efficient separation of hydrogen sulfide, carbon dioxide, and light hydrocarbon streams (e.g., liquefied petroleum gas (LPG), which can comprise mainly propane, mainly butane, or a mixture thereof) from a sour natural gas feed stream with low capital cost, low utility consumption (and thus low operating cost), and zero emission of carbon dioxide to the atmosphere.

In one or more embodiments, it may be desirable to provide an ethane product stream separate from the non-permeate stream exiting in line 225 that comprises mainly methane when starting with a sour natural gas source 202. The system and method may be implemented substantially as already described above. With reference to FIG. 3, however, the overhead vapor stream leaving the second contacting column 231 in line 232 (which comprises ethane and carbon dioxide) can be processed to separate a substantially pure ethane stream from the ethane and carbon dioxide. This may be accomplished, for example, by passing the overhead vapor stream in line 232 to a carbon dioxide separation unit 261 wherein the stream of ethane and carbon dioxide is heated to near ambient temperature, and at least 50%, at least 75%, or at least 90% of the carbon dioxide on a molar basis present in the stream in line 232 is separated out. A stream of substantially pure carbon dioxide may then exit the carbon dioxide separation unit 261 in line 262, and a stream of ethane and higher hydrocarbons may be passed in line 263 to an ethane separator 271, which can include a reboiler and/or an overhead condenser, and which can comprise any conventional ethane separation system. The ethane separator can be effective to provide an ethane stream (which is preferably substantially pure) in line 272 and a stream of $C_4$ and greater hydrocarbons in line 273, which stream can be mixed with the product stream in line 255 comprising mainly $C_4$ and greater hydrocarbons. This can be particularly useful in embodiments wherein the amount of ethane in the sour natural gas source is relatively high. In some embodiments, the separation unit 261 may be a membrane separation unit. Moreover, the separation unit 261 can be adapted to or configured to remove at least 80%, at least 85%, or at least 90% of any carbon dioxide present in the overhead vapor stream in line 232 exiting the second distillation column 231.

Another alternative configuration to enhance ethane recovery in the second contacting column 231 and potentially produce a high purity ethane product stream can comprise introducing an additive stream to an appropriate location proximate the top of the second contacting column 231 to break azeotropes within the column. As described above, this can provide for maximizing the recovery of ethane and carbon dioxide in the overhead vapor stream leaving the second contacting column 231 in line 232. The additive stream additionally or alternatively may be added to the third contacting column 241. The additive stream is preferably a hydrocarbon stream rich in $C_4$ hydrocarbons but also can contain $C_3$ and/or $C_5$ or greater hydrocarbons. In some embodiments, the additive stream can comprise predominately $C_4$ or greater hydrocarbons and may comprise less than 5% or less than 2% (on a molar basis) of any $C_3$ hydrocarbons. The overhead vapor stream leaving the second contacting column in line 232 thus can be either mixed with the overhead vapor stream leaving the first contacting column 210 in line 211 prior to the carbon dioxide separation or can be further processed to separate ethane and carbon dioxide and also recover an additive stream. The latter can be accomplished when the separation unit 261 is a carbon dioxide recovery column, and the overhead vapor stream leaving the second contacting column in line 232 is directed to the carbon dioxide recovery column equipped with a reboiler and condenser wherein a carbon dioxide rich stream can be withdrawn from a top portion of the column in line 262. The liquid bottom product from the carbon dioxide recovery column in line 263 can be introduced into the ethane separator 271 (e.g., an ethane recovery column), equipped with a reboiler and condenser, wherein an overhead vapor stream enriched in ethane is provided in line 272, and liquid bottom mainly containing additive stream component is provided in line 273. A portion of the $C_4$ and greater hydrocarbon stream in line 257 may be provided in line 257c to the separation unit 261. A further carbon dioxide separation unit 281 may be provided for receiving the permeate stream in line 223 that comprises mainly carbon dioxide. This separation unit 281 can be adapted to or configured to provide a vapor stream in line 223a (which can comprise mainly methane and a variable content of carbon dioxide and/or ethane) that can be mixed with the stream in line 211 prior to input to the overhead vapor stream treatment unit 221. The separation unit 281 further can be adapted to or configured to provide a stream of liquid carbon dioxide in line 223b. Such liquid carbon dioxide can be substantially pure in some embodiments. As desired, the liquid carbon dioxide in line 223b can be utilized as a solvent and added through line 228 to stream 203 and/or may be exported in line 224.

The systems and methods described herein can be integrated with any chemical process that requires clean-up of a gaseous stream including sulfur species, and hydrogen sulfide in particular. Any carbon dioxide utilized in the solvent may be derived from a number of sources and, for example, can originate from a carbon dioxide containing stream within the integrated process or an external source.

In some embodiments, the systems and methods described herein can be integrated with an oxy-fuel power cycle where in the fuel gas stream is contaminated with sulfur species, such as hydrogen sulfide. The inherent nature of oxy-fuel combustion enables facile separation of by-product carbon dioxide from fuel combustion. This carbon dioxide by-product can be used to clean-up the fuel gas feed if it is contaminated with sulfur species. Any one or more of the streams described herein comprising a fuel gas may be utilized in an oxy-fuel combustion system. As non-limiting examples, any of the following streams may be utilized as the fuel stream: the overhead vapor stream leaving the first contacting column (110, 210) in line 111/211; the permeate stream exiting a single stage membrane separation unit (121, 221) in line 123/223; the vapor stream exiting the separation unit 281 in line 223a.

In one or more embodiments, it may be desirable to provide a product stream that has a very low carbon dioxide content. As such, it can be beneficial to treat the overhead vapor stream (111, 211) utilizing one or more further contacting columns. For example, referring to FIG. 1 through FIG. 3, the overhead vapor stream treatment unit (121, 221) into which the overhead vapor stream (111, 211) is injected can be a distillation column. More particularly, the overhead vapor stream (111, 211) can be injected into a substantially middle section of the distillation column forming the overhead vapor stream treatment unit (121, 221), and a stream of $C_4$ and greater hydrocarbons can be introduced into the distillation column above the injection point of the overhead vapor stream. At least a portion of the stream of $C_4$ and greater hydrocarbons can be a stream taken from line 257 (or a branch thereof). If beneficial, at least a portion of the stream of $C_4$ and greater hydrocarbons can be provided from an outside source. The introduction of the $C_4$ and greater hydrocarbons into the distillation column can be useful to substantially suppress the freezing of carbon dioxide present in the overhead vapor stream (111, 211) which would otherwise be expected to occur at typical temperatures required to obtain methane purity of greater than 90% molar. For example, at a pressure of about 40 bar, the required condenser temperature to obtain methane with approximately 50 ppm molar carbon dioxide content is about −88° C. The amount of the $C_4$ and greater hydrocarbons that is injected into the distillation column can be chosen such that freezing of carbon dioxide will be substantially or completely suppressed at all points within the distillation column and any associated condenser. According to such embodiments, the bottom liquid product can exit the distillation column in line 123/223 and can mainly contain carbon dioxide and substantially all of the $C_4$ and greater hydrocarbons introduced into the column. The bottom liquid product can be optionally reduced in pressure and processed in a further carbon dioxide separation unit (see 281 in FIG. 3), which may be a flash column or a second distillation column. This additional processing can provide high purity carbon dioxide as an overhead product (e.g., as in line 223*b* of FIG. 3) and recover the $C_4$ and greater hydrocarbons as the bottom liquid product stream. The $C_4$ and greater hydrocarbons that are recovered from the carbon dioxide separation unit can be pumped and recycled back into the system. Carbon dioxide can be optionally recompressed and reused as the solvent for the contacting column (110, 210) and/or exported. The product stream in line 125/225 thus can comprise a product gas (e.g., methane) with significantly low content of sulfurous material (e.g., less than 2 ppm molar) and a tunable carbon dioxide content that can be similarly low (e.g., less than 500 ppm, less than 100 ppm, or less than 10 ppm) as desired.

In further embodiments, the present systems and methods can provide for the expansion of existing natural gas processing plants wherein an existing carbon dioxide removal system generates a stream of pure carbon dioxide by-product. The methods described here can take the advantage of an available $CO_2$ stream and increase the sulfur-removal capacity of the plant.

In other embodiments, the present systems and methods can be utilized in removing sulfur from syngas produced from coal gasification process, and the cleaned syngas can be used for power generation or chemical production, such as with an integrated gasification combined cycle (IGCC) or a Poly-Gen process. Typically, clean and pure carbon dioxide can be produced from an IGCC system with pre-combustion carbon dioxide removal or from a chemical production system. Carbon dioxide can be used as for the removal of $H_2S/COS$ and other reducing sulfur species in the raw syngas produced from a coal gasification process.

The presently disclosed systems and methods can be utilized generally to process a contaminated multi-component feed stream (e.g., contaminated with a sulfurous material) to provide a cleaned product gas and a stream comprising at least the contaminant. The latter stream can be processed in a variety of manners to provide further products. Non-limiting examples of the further processing are provided below.

In one or more embodiments, the present disclosure can encompass systems and methods wherein a multi-component feed stream including a sulfurous material is injected in line 505 into a sulfur separation system 500 that may include any combination of parts as otherwise described herein to provide for separation of at least a portion of the sulfurous material from the multi-component feed stream. A substantially purified gaseous product is thus provided in line 525, and sulfurous product is provided in line 542 to a sulfur process unit 590. Processing in the sulfur process unit can be carried out in a variety of manners and can be adapted to or configured to provide a stream of substantially purified sulfur product in line 591, a solvent export stream in line 592, and a solvent recycle stream in line 593.

In one or more embodiments, the present disclosure can encompasses systems and methods wherein a multi-component feed stream including a sulfurous material is contacted with a solvent comprising liquid carbon dioxide, and one or more processing steps from an oxy-Claus process are carried out in order to provide a substantially clean product gas, elemental sulfur, and carbon dioxide. In such embodiments, a multi-component feed stream including a sulfurous material can be processed as already described herein such that the sulfurous material from the multi-component feed stream is separated by the liquid carbon dioxide and removed as a liquid bottom product and a gaseous product that is substantially free of the sulfurous material is removed as an overhead vapor stream. As shown in FIG. 6, a multi-component feed stream including a sulfurous material is injected in line 605 into a sulfur separation system 600 that may include any combination of parts as otherwise described herein to provide for separation of at least a portion of the sulfurous material from the multi-component feed stream. A substantially purified gaseous product is thus provided in line 625, and sulfurous product is provided in line 642 to a sulfur process unit 690, which is this example embodiment is an oxy-Claus unit. A carbon dioxide solvent stream is provided in line 693 to the sulfur separation system 600, and the sulfurous product in line 642 thus can include a content of carbon dioxide. The oxy-Claus unit 690 can be adapted to or configured to provide a sulfur recovery of greater than 90%, greater than 95%, or greater than 99% on a molar basis. To this end, the desired concentration of the sulfurous material present in the sulfurous product stream in line 642 can be converted into liquid elementary sulfur as a by-product and removed in line 691. A portion of recovered carbon dioxide can be liquefied and recycled in line 693 to the sulfur separation system 600. A portion of the carbon dioxide may be exported in line 692 for sequestration and/or used for EOR and/or used for other chemical processes. The heat Q generated from the oxy-Claus unit 690 can be used for power generation in power unit 699 or other chemical processes. The oxy-Claus unit 690 can be adapted to or configured to combined oxygen with hydrogen sulfide to produce elemental sulfur and water according to the following reaction:

$$2H_2S+O_2=2S+2H_2O+\text{heat}.$$

The system and method thus can require input of oxygen in line 698*a* from an oxygen source 698 and can output heat Q, which can be utilized for power generation, along with elemental sulfur, water, and carbon dioxide products (the carbon dioxide being recycled from the content of carbon dioxide that was present in the original liquid bottom stream).

In one or more embodiments, the present disclosure can encompasses systems and methods wherein a multi-component feed stream including a sulfurous material is contacted with a solvent comprising liquid carbon dioxide, and oxy-gas combustion plus flue gas desulfurization are carried out. In such embodiments, a multi-component feed stream including a sulfurous material can be processed as already described herein such that the sulfurous material from the multi-component feed stream is separated by the liquid carbon dioxide and removed as a liquid bottom product and a gaseous product that is substantially free of the sulfurous material is removed as an overhead vapor stream. As shown in FIG. 7, a multi-component feed stream including a sulfurous material is injected in line 705 into a sulfur separation system 700 that may include any combination of parts as otherwise described herein to provide for separation of at least a portion of the sulfurous material from the multi-component feed stream. A substantially purified gaseous product is thus provided in line 725, and sulfurous product is provided in line 742 to an oxy-sulfur burner 790. A carbon dioxide solvent stream is provided in line 793 to the sulfur separation system 700, and the sulfurous product in line 742 thus can include a content of carbon dioxide. The sulfurous product and carbon dioxide in line 742 is sent to the oxy-sulfur burner 790 along with oxygen in line 798a from an oxygen source 798 to fully oxidize the sulfur species (e.g., to form $SO_2$ and $SO_3$). The combustion flue gas (which typically will comprise $CO_2$, $H_2O$, $SO_2$, and $SO_3$) can be sent in line 790a to a flue gas desulfurization unit 797 with limestone injection through line 797a, and sulfur can be separated from the flue gas in the form of gypsum through line 797b, as well as water in line 797c. A portion of cleaned carbon dioxide can be liquefied and recycled through line 792 for use as otherwise described above. The heat Q generated from the oxy-sulfur burner 790 can be used for power generation (e.g., in a steam cycle power generation unit 796) or other chemical processes.

In one or more embodiments, the present disclosure can encompasses systems and methods wherein a multi-component feed stream including a sulfurous material is contacted with a solvent comprising liquid carbon dioxide, and oxy-gas combustion plus wet sulfuric acid processing are carried out. In such embodiments, a multi-component feed stream including a sulfurous material can be processed as already described herein such that the sulfurous material from the multi-component feed stream is separated by the liquid carbon dioxide and removed as a liquid bottom product and a gaseous product that is substantially free of the sulfurous material is removed as an overhead vapor stream. As shown in FIG. 8, a multi-component feed stream including a sulfurous material is injected in line 805 into a sulfur separation system 800 that may include any combination of parts as otherwise described herein to provide for separation of at least a portion of the sulfurous material from the multi-component feed stream. A substantially purified gaseous product is thus provided in line 825, and sulfurous product is provided in line 842 to a sulfuric acid processing unit 890. A carbon dioxide solvent stream is provided in line 893 to the sulfur separation system 800, and the sulfurous product in line 842 thus can include a content of carbon dioxide. The sulfurous product and carbon dioxide is then sent to the wet sulfuric acid process unit 890 where it is combined with oxygen in line 898a from an oxygen source 898 to produce concentrated sulfuric acid in line 895. Sulfur can be removed from a gaseous carbon dioxide stream in the form of liquid phase, which includes concentrated sulfuric acid. A portion of cleaned carbon dioxide can be liquefied and recycled in line 893 and/or exported for use as already descried above. The heat Q generated from the process can be used for power generation in power unit 896 or other chemical processes.

In one or more embodiments, the present disclosure can encompasses systems and methods wherein a multi-component feed stream including a sulfurous material is contacted with a solvent comprising liquid carbon dioxide, and mineral carbonation processing is carried out. In such embodiments, a multi-component feed stream including a sulfurous material can be processed as already described herein such that the sulfurous material from the multi-component feed stream is separated by the liquid carbon dioxide and removed as a liquid bottom product and a gaseous product that is substantially free of the sulfurous material is removed as an overhead vapor stream. The liquid bottom product comprising carbon dioxide and the sulfurous material is then elevated in pressure (e.g., to about 120 bar) and sent to a heater. The heater can be maintained at a temperature of approximately 120° C. via combustion of a portion of the product gas under either oxy or air fired conditions. The heated and pressurized bottom stream including carbon dioxide and the sulfurous material can be reacted with hematite either above or below grade. The reaction results in the formation of compounds such as solid phase pyrrhotite, mascarite, and/or pyrite. The resulting chemistry can be disposed of in place or exploited for commercial use.

EXAMPLE

An example embodiment of a system and method for separation of a sulfurous material from a multi-component feed stream is described below in relation to FIG. 4. The examiner embodiment particularly relates to the separation of hydrogen sulfide from a sour natural gas stream. It is understood, however, the components used in the system described below and process steps used in the method described below may be applied in any combination (or be specifically excluded) from systems and methods as otherwise described herein for separation of other sulfurous materials from natural gas or other multi-component feed streams.

Specific process conditions for the removal of hydrogen sulfide, carbon dioxide, and $C_3$ and greater hydrocarbons from a sour natural gas stream are calculated below based upon an example natural gas stream source 18, which comprises (on a molar basis) 65% $CH_4$, 6.5 $C_2H_6$, 3% $C_3H_8$, 0.46% $nC_4H_{10}$, 0.54% $iC_4H_{10}$, 0.4% $C_5H_{12}$, 0.1% $C_6H_{14}$, 16% $H_2S$, and 8% $CO_2$. The natural gas stream source 18, at a temperature of about 30° C. and a pressure of about 42 bar and saturated with water vapor, is cooled to about 5° C. in heat exchanger 1 exiting in line 19. The first cooled natural gas stream in line 19 is passed through a separator 2, and a condensed water and residual condensable heavy hydrocarbons stream is removed from separator 2 in line 20 while a saturated feed gas stream is provided in line 21. The saturated feed gas stream in line 21 is dried to a dew-point of about −60° C. or lower in a desiccant drier 3 (e.g., a dual bed desiccant drier package), which is thermally regenerated using a nitrogen stream with nitrogen inlet line 22a and nitrogen outline line 22b.

The dried natural gas stream exits the desiccant drier 3 in line 27 for delivery to a counter-current, multi-stage vapor/liquid contacting first distillation column 10, which is provided with two sections of contactors (23 and 24), which can be either trays or structured packing. The first distillation column 10 is provided with a re-boiler heat exchanger 17, which boils part of the column bottom liquid stream in line 25 providing a partially vaporized outlet stream in line 26, which is returned to the base of the first distillation column 10. Optionally, the heating duty in the reboiler heat exchanger 17 can be provided by diverting at least a portion of the dried crude natural gas feed stream in line 27 to the reboiler heat exchanger as inlet stream 27a and outlet stream 27b, which is re-inserted into line 27.

Prior to entry into the first distillation column 10, the dried natural gas feed stream 27 is cooled in heat exchanger 7 to a temperature of about −50° C. to provide a cooled natural gas feed stream in line 28 which enters the first distillation column between the two separation sections 23 and 24. The heat exchanger 7 is also utilized to cool the carbon dioxide solvent stream in line 29, which is at a pressure of about 67 bar and a temperature of about 30° C. The carbon dioxide solvent stream is cooled to a temperature of about −50° C., and the pressure of the carbon dioxide solvent stream is reduced to about 41 bar by expansion across valve 30 before entering the first distillation column 10 in line 31 above separation section 23.

Within the first distillation column 10, downward flowing liquid solvent from line 31 contacts upward flowing vapor from line 28 to form an overhead product gas stream 32 at a temperature of about −56° C., the overheat product gas stream preferably containing a maximum of about 2 ppm hydrogen sulfide and more preferably less than 1 ppm hydrogen sulfide. The liquid bottom stream in line 25 branches in line 33 to provide a liquid stream at a temperature of about −46° C., which is removed from the base of the first distillation column and contains substantially all of the hydrogen sulfide and $C_2$ and greater hydrocarbons present in the natural gas feed stream 18.

The content of carbon dioxide in the overhead vapor stream in line 32 can be minimized by reducing the temperature of the solvent stream 31 as much as possible without reaching the freezing temperature of the carbon dioxide therein. It may be desirable (e.g., when the hydrogen sulfide concentration is high) to minimize the amount of reflux liquid carbon dioxide that is fed to the first distillation column. This can be accomplished by removing heat simultaneous to the mass transfer from one or two stages in the first distillation column 10 above the sour natural gas feed point in line 31 in order to provide refrigeration to promote the condensation of the hydrogen sulfide rather than rely on refrigeration provided from the carbon dioxide reflux stream. As a non-limiting example, a suitable contacting device is an aluminum plate-fin heat exchanger with two sets of passages. The first contains an evaporating liquid carbon dioxide stream at a pressure that allows heat transfer from the distillation stage. The second introduces down-flowing liquid from the stage above and up-flowing gas from the stage below into a two phase distributor at the base of each passage so that the mixed vapor and liquid can flow upwards into a separator that feeds the equilibrated gas and liquid streams back into the column.

In some embodiments, a significant reduction in the carbon dioxide content of the gas stream 38 entering the separation unit 4 can be achieved by processing the overhead vapor stream from the first distillation column 10 to remove excess carbon dioxide. This can ensure that a single stage membrane unit can be used to produce the final purified natural gas stream 41 containing 2% carbon dioxide. This is achieved by taking a carbon dioxide permeate stream in line 40 from the membrane carbon dioxide separator 4, compressing in compressor 5, cooling in heat exchanger 6 (to provide the stream in line 29) and further cooling in heat exchanger 7 to provide the stream in line 53, which is feed into a third distillation column 50. The third distillation column 50 is equipped with a reboiler 51. Line 54 for the bottom product stream branches to line 54a to deliver bottom product liquid to the reboiler, and the liquid bottom product returns to the third distillation column in line 54b. Heat fluid inlet line 90a and heat fluid outlet line 90b can deliver any suitable heating stream to the reboiler 51. The third distillation column 50 can be configured to strip most of the methane from the permeate stream leaving the single stage membrane unit 4 giving a bottoms liquid product carbon dioxide stream 54 containing about 5% molar of a mixture of methane and ethane at a pressure of about 41 bar and a temperature of about −1° C. A net carbon dioxide product stream in line 80 can be taken from the liquid carbon dioxide stream in line 54. The overhead stream in line 55 leaving the third distillation column 50 at a pressure of about 41 bar and a temperature of about −52° C. is heated in the heat exchanger 7 to about 25° C. to exit in 56 and merge with the gas stream in line 38 entering the carbon dioxide separation membrane unit 4.

Refrigeration duty to the heat exchanger 7 that is used to cool the liquid carbon dioxide-containing solvent and the feed natural gas steams entering the first distillation column 10 to the required temperature levels and to heat exchange other streams can be provided using a closed cycle refrigeration loop that preferably utilizes carbon dioxide as the refrigerant. As seen in FIG. 4, first and second evaporating liquid $CO_2$ streams in lines 41 and 42 at about −53° C./6 bar and about 2° C./36 bar pass to the heat exchanger 7 and are injected back into the refrigeration system 8 in lines 62 and 63. Any suitable refrigeration system can be utilized. For example, the refrigeration system 8 can include a recycle compressor and inter-stage water coolers.

The overhead vapor stream in line 32 exiting the first distillation column 10 can be at a pressure of about 41 bar and have substantially the following composition (on a molar basis): 80% $CH_4$; 0.9% $C_2H_6$; 18.39% $CO_2$; and 1.0 ppm $H_2S$. The overhead vapor stream in line 32 is heated in heat exchanger 7 to about 25° C. to form the stream in line 38. To achieve a desirably low concentration of carbon dioxide in the final natural gas product stream in line 41, the carbon dioxide separator membrane 4 can be a single stage membrane system or a multi-stage membrane system, such as a UOP Separex™ system. In this example, a single-stage carbon dioxide membrane unit was used which would result in a relatively high hydrocarbon loss in the permeate stream 40 leaving the membrane. A carbon dioxide permeate stream in line 40 can be provided at a pressure of about 1.1 bar and can have the following composition (on a molar basis): 52.2% $CH_4$; 1.5% $C_2H_6$; and 46.4% $CO_2$. The permeate stream in line 40 can be compressed to about 67 bar in the compressor 5 (which can be an intercooled compressor) and cooled to about 30° C. in the cooler 6 to provide the stream in line 53, which is delivered to the third distillation column 50.

The sour natural gas stream in source 18 preferably contains at least the quantity of carbon dioxide that may be required for a natural gas product stream—e.g., in the range of 2% molar. Any additional carbon dioxide in the sour natural gas stream in source 18 above the required product quantity can be produced as a net product carbon dioxide as already described above.

The bottom product stream in line 33 exiting the first distillation column 10 can be delivered into a mid-point of a second distillation column 14 equipped with an overhead condenser 15 and a reboiler 16. In operation of the second distillation column 12, it can be useful to reduce the pressure of the feed stream in line 33, such as utilizing valve 86, to a pressure in the range of about 15 bar to about 45 bar to ensure that the separated hydrogen sulfide is in the vapor phase and to increase the relative volatility of the hydrogen sulfide to the hydrocarbon components. Operating in such a reduced pressure range can be useful to improve the relative volatility of ethane and other constituents of the mixture and promote the separation of ethane from the sulfurous material. Heat fluid inlet line 92a and heat fluid outlet line 92b can deliver any suitable heating stream to the reboiler 16. The second distillation can be adapted to or configured to produce an overhead vapor stream in line 34 at a pressure of about 40 bar and a temperature of about −39° C., the overhead vapor stream containing substantially all of the carbon dioxide separated from the bottom product stream in line 33 with less than 2 ppm of hydrogen sulfide and less than 100 ppm of a mixture of $C_3H_8$ and $C_4H_{10}$. The second distillation can be adapted to or configured to produce a bottom product liquid stream in line 35 that contains less than 2% (molar) carbon dioxide. The substantially complete separation of the hydrogen sulfide stream can be assisted by the injection through line 57 of a recycle stream containing light naphtha (e.g., including predominantly $C_4$ to $C_6$ hydrocarbons), the injection being to an intermediate reflux point above the inlet feed point for the stream of line 33. The overhead vapor stream in line 34 can have the following composition (on a molar basis): 60.2% $CH_4$; 11.7% $C_2H_6$; and 28.1% $CO_2$. The overhead vapor stream in line 34 merges with the overhead vapor stream in line 55 leaving the third distillation column 50 and is then heated in heat exchanger 7 to about 25° C., leaving the heat exchanger 7 in line 56. Optionally, the overhead vapor stream in line 34 may be compressed in compressor 85 prior to mixing with the stream of line 55. The mixed overhead vapor streams in line 56 are then added to the top product stream in line 32 from the first distillation column 10 to provide the membrane inlet stream in line 38. Optionally, the stream in line 34, which contains about 91.7% (molar) of the ethane in the sour natural gas source stream 18, can be processed to separate an ethane product by first removing the bulk of the carbon dioxide at about 25° C. with a polymeric membrane unit followed by a distillation column to separate a substantially pure ethane stream as a liquid product from the column base and a $CH_4+CO_2$ product overhead, which is recycled as described.

The bottom liquid product stream in line 35 exiting the second distillation column 14 can have the following composition (on a molar basis): 1.0% $C_2H_6$; 34.5% $C_3H_8+C_4H_{10}$; 63.4% $H_2S$; and 1.1% $CO_2$. The stream in line 35 enters the mid-point of a fourth distillation column 12 equipped with an over-head condenser 11 and a reboiler 13. Heat fluid inlet line 94a and heat fluid outlet line 94b can deliver any suitable heating stream to the reboiler 13. Likewise, cooling fluid inlet line 96a and cooling fluid outlet line 96b can deliver any suitable cooling stream to the condenser 11. The fourth distillation column can be adapted to or configured to separate the feed stream in line 35 into an overhead vapor stream in line 36 containing substantially all of the hydrogen sulfide and a bottom liquid hydrocarbon stream in line 37 containing less than 0.1 ppm hydrogen sulfide. A portion of the bottom liquid hydrocarbon stream in line 37 can be circulated through the reboiler 13.

In operation of the fourth distillation column 12, it can be useful to reduce the pressure of the feed stream in line 35, such as utilizing valve 39, to a pressure in the range of about 10 bar to about 20 bar to ensure that the separated hydrogen sulfide is in the vapor phase and to increase the relative volatility of the hydrogen sulfide to the hydrocarbon components. It can also be useful to add a hydrocarbon additive stream rich in $C_4$ and greater hydrocarbons to an appropriate stage within the fourth distillation column 12 between the condenser and feed inlet stage. The hydrocarbon additive stream preferably is a relatively low volatility component and can have, for example a composition as follows (on a molar basis): 1% $C_3$; 61.1% $C_4$; 29.8% $C_5$; and 8.1% $C_6$. The hydrocarbon additive steam can function as a scrubbing solvent for the $C_3$ and greater hydrocarbons present in the feed stream in line 35. Any light naphtha stream can be used; however, a preferred additive stream will be rich in $C_4$ and $C_5$ hydrocarbons.

The top product vapor stream in line 36 exiting the fourth distillation column 12 at a pressure of about 17 bar and a temperature of about 12° C. can have the following composition (on a molar basis): 83.6% $H_2S$; 13.6% $C_2H_6$; 1.4% $CO_2$; and 1.4% $C_3H_8+C_4H_{10}$. The remaining hydrocarbon components are present in the bottom liquid product stream exiting the fourth distillation column 12 in line 37 at a temperature of about 118° C., which stream is processed in a standard $C_3$ to $C_6$ recovery system 9, which also separates the light naphtha stream, which is recycled in line 38 and line 64 to the fourth distillation column and in line 57 to the second distillation column 14. In some embodiments, the recovery system 9 can comprise one or more distillation columns wherein separation and fractionation of $C_3$ and greater hydrocarbons can be carried out to provide a desired blend of hydrocarbons. As illustrated, recovery system 9 particularly can comprise a de-propanizer similar to separator 251 in FIG. 3 wherein a purified propane stream and a stream of $C_4$ and greater hydrocarbons can be produced. In particular, a the top product stream in line 66 can comprise propane and, optionally, a minor content of $C_4$ and greater hydrocarbons (e.g., at least 80%, at least 85%, or at least 90% molar propane). A bottom product stream in line 65 can comprise predominately $C_4$ and greater hydrocarbons. It is from line 66 which the light naphtha stream discussed above can be withdrawn as line 66a for input to line 38 and 57.

As discussed above, the presently exemplified system and method operates with refrigeration provided by a refrigeration system 8, which preferably uses carbon dioxide as the working fluid. The heat exchanger 7 is provided with two streams of liquid $CO_2$ refrigeration. In this example, the first liquid carbon dioxide stream 41 evaporates at a pressure of 6 bar and a temperature of −53° C., and the second liquid carbon dioxide stream 42 evaporates at a pressure of 37 bar and a temperature of 2° C. The precise evaporating pressure of the carbon dioxide refrigerant can depend on the composition and pressure of the inlet natural gas stream. The condenser 15 associated with the second distillation column 14 can also be cooled using refrigeration provided by the refrigeration system 8. As illustrated, line 60 branches from line 41 to deliver liquid carbon dioxide refrigerant to the condenser 15, and the return stream in line 61 is combined with line 62. The coolant passing in lines 96a and 96b for condenser 11 can be, for example, a chilled brine, which also may provide refrigeration for the feed natural gas heat exchanger 1. The reboilers 16 and 13 and 17 can be heated, for example, using low pressure steam. In areas where ambient temperatures are very high and cooling water systems are not available then air cooling can be used together with closed circuit refrigeration based on carbon dioxide and/or propane systems. Note that the performance of the distillation columns 10, 14, 12 and 50 can be based on the adjustment of the re-boil and reflux rates by controlling the heating and cooling duties provided.

The foregoing example was modeled based on a dried multi-component feed stream flowrate of 8,000 Kg mols/hr at a pressure of 42 bar and a temperature of 30° C. in line 27, wherein the multi-component feed stream had the following composition (on a molar basis): 65% $CH_4$; 6.5% $C_2H_6$; 3.0% $C_3H_8$; 1.0% $C_4H_{10}$; 0.4% $C_5H_{12}$; 0.1% $C_6H_{14}$; 8.0% $CO_2$; and 16.0% $H_2S$. The evaluation also considered a flowrate of 5,596.75 Kg mols/hr of the substantially pure natural gas product in line 41 at a pressure of 40 bar and a temperature of 30° C. and having the following composition (on a molar basis): 92.9% $CH_4$; 5.1% $C_2H_6$; 2.0% $CO_2$; and 1.0 ppm $H_2S$. The evaluation further considered a flowrate of 533.2 Kg mols/hr of net carbon dioxide product in line 80 from a single stage membrane separation unit followed by the carbon dioxide purification carried out in column 50 at a pressure of 42 bar and a temperature of 25° C., the carbon dioxide stream having the following composition (on a molar basis): 3.1% $CH_4$; 95.0% $CO_2$; and 1.9% $C_2H_6$. The evaluation likewise considered a flowrate of 1531 Kg mols/hr for a sulfur product at a pressure of 17 bar and a temperature of 1° C. and having the following composition (on a molar basis): 13.7% $C_2H_6$; 1.0% $C_3H_8$; 0.3% $C_4H_{10}$; 83.6% $H_2S$; and 1.4% $CO_2$. The evaluation still further considered a flowrate of 1389.1 Kg mols/hr of liquefied petroleum gas in line 37 having the following composition (on a molar basis): 16.9% $C_3H_8$; 51.6% $C_4H_{10}$; 24.8% $C_5H_{12}$; 6.7% $C_6H_{14}$; and 0.1 ppm $H_2S$. Note that the additive to the second and third column is a light naphtha stream with a composition of 1% $C_3$, 34% $nC_4$, 27% $iC_4$, 30% $C_5$, and 8% $C_6$ (on a molar basis) which must be separated and recycled.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for removing hydrogen sulfide from a hydrocarbon-containing fuel gas, the method comprising:
   contacting a stream of a hydrocarbon-containing fuel gas including hydrogen sulfide with liquid carbon dioxide;
   recovering a liquid stream comprising at least a portion of the hydrogen sulfide; and
   recovering a gas stream comprising at least a portion of the hydrocarbon-containing fuel gas.

2. The method of claim 1, wherein the contacting is carried out in a distillation column.

3. The method of claim 1, wherein the stream of the hydrocarbon-containing fuel gas further includes one or more of carbonyl sulfide, thiol-containing compounds, carbon disulfide, and disulfide bond-containing compounds.

4. The method of claim 1, wherein the liquid carbon dioxide is at one or both of a temperature of about −10° C. to about −55° C. and a pressure of about 7 bar to about 60 bar.

5. The method of claim 1, further comprising processing the gas stream comprising at least a portion of the hydrocarbon-containing fuel through a separation unit configured for removal of at least a portion of any carbon dioxide present in the gas stream comprising at least a portion of the hydrocarbon-containing fuel.

6. The method of claim 5, wherein the separation unit is a membrane separator configured for separating the gas stream comprising at least a portion of the hydrocarbon-containing fuel into a product stream comprising the hydrocarbon-containing fuel and a permeate stream comprising at least carbon dioxide.

7. The method of claim 6, wherein the product stream comprising the hydrocarbon-containing fuel contains less than 2 ppm molar of hydrogen sulfide.

8. The method of claim 6, wherein the product stream comprising the hydrocarbon-containing fuel contains less than 2% molar of carbon dioxide.

* * * * *